(12) United States Patent
Morinaga

(10) Patent No.: US 6,378,085 B1
(45) Date of Patent: Apr. 23, 2002

(54) HIGH RELIABILITY SYSTEM, APPARATUS AND METHOD FOR GENERATING CONNECTIVE RELATION, AND COMPUTER READABLE STORAGE MEDIUM

(75) Inventor: Satoshi Morinaga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/333,010

(22) Filed: Jun. 15, 1999

(30) Foreign Application Priority Data

Jun. 15, 1998 (JP) .......................................... 10-166556

(51) Int. Cl.[7] .............................................. G06F 11/00
(52) U.S. Cl. ............................................. 714/3; 714/47
(58) Field of Search ............................... 714/1, 3, 7, 8, 714/47; 709/220, 221, 239

(56) References Cited

U.S. PATENT DOCUMENTS

| 5,271,014 A | 12/1993 | Bruck et al. ............... 371/11.1 |
| 5,727,143 A | * 3/1998 | Morinaga ...................... 714/3 |

FOREIGN PATENT DOCUMENTS

| JP | H05-257908 | 8/1993 |
| JP | 6-28330 | 2/1994 |
| JP | 6-119305 | 4/1994 |
| JP | 6-131314 | 5/1994 |
| JP | 8-44683 | 2/1996 |
| JP | 8-292933 | 11/1996 |

\* cited by examiner

*Primary Examiner*—Scott T. Baderman
(74) *Attorney, Agent, or Firm*—Foley & Lardner

(57) ABSTRACT

Failure rate cost assigning means 81 assigns a cost to each functional unit in functional unit set 1 in accordance with a failure rate thereof. Random cost assigning means 82 assigns a random cost to each functional unit. Duplication cost assigning means 83 assigns to each functional unit a cost in accordance with the number of connective relations that use the functional unit. Connective relations are stored in connective relation storage 5. As a result, the sum of the costs is stored in cost storage section 92. Constraint storage section 93 stores the constraints on connective relations of the functional units. Connective relation generating means 84 interprets the sum of the costs stored in cost storage section 92 as the cost of each functional unit. Connective relation generating means 84 generates a set of connective relations of functional units which minimizes a sum of the costs of the functional units from the connective relations of the functional units which satisfy the constraints stored in constraint storage section 93. Connective relation generating means 84 stores the set of the connective relations in connective relation storage 5.

20 Claims, 24 Drawing Sheets

HIGH RELIABILITY SYSTEM, APPARATUS AND METHOD FOR GENERATING CONNECTIVE RELATION, AND COMPUTER READABLE STORAGE MEDIUM

BACKGROUND OF THE INVENTION

1. Field of the Invention

The present invention relates to a high reliability system, an apparatus and method for generating connective relations to construct the high reliability system, and computer readable storage medium that stores a program to realize the method, and in particular, to such system, apparatus and method which can flexibly deal with constraints imposed on the system.

2. Description of the Prior Art

There is known a fault tolerance system of which reliability is assured. Such system is required to continue service even when a failure occurs in a part of the system. One of the prior arts of such system is disclosed in JPA 8-292933.

FIG. 24 is a block diagram showing a configuration of the prior art.

In this system, generation device 106 previously obtains connective relations among functional units (in case of parallel processors, processors and links each disposed between processors) in functional unit set (for example, parallel processors) 101 necessary to realize services, and stores connective relations in connective relation storage 5.

If detector 4 detects that failure occurs in a functional units contained in functional unit set 1, selector 3 selects connective relations that do not include failed units from the connective relations stored in connective relation storage 5. Based on this selection, alteration device 2 connects functional units in functional unit set 1 so as to resume providing the services.

Thus, in the prior art, whether the service can be resumed when a failure occurs in functional units depends on whether the connective relations not including the failed functional units is stored in connective relation storage 5. As a result, functional unit assignment device 107, which consists of constraint section 107a, naming section 107b, distribution section 107c and reserve section 107d, assigns functional units in such a way that a functional unit used in each connective relation does not duplicate as long as possible based on the reliability equation, and the connective relation is generated based on this assignment.

However, the functional unit assignment by such functional unit assignment device 107 causes the following disadvantages:

First, functional unit assignment device 107 assigns the functional unit used in each connective relation not in consideration of constraints such as a topology of the connective relation and operational timing. Therefore, in the prior art, when generation device 106 generates the connective relation, available functional units are extremely limited, and it is difficult to deal with the above constraints.

The assignment of the functional units to each connective relation has a number of options, and the reliability equation is an extremely complicated function in accordance with the duplicated manner of the functional unit assigned to each functional unit. Further, even if the constraints are taken into accounts, whether the connective relation capable of satisfying the constraint can be generated by using only the functional units assigned by functional unit assignment device 107 has not been determined until the connected relation is practically generated. Namely, in the prior art, even if the constraints are taken into accounts, it is necessary to solve an extremely complicated optimization problem, and thus there is a disadvantage in which a computational complexity required for generating the connective relation becomes large.

Further, in the prior art, the connective relation generated by generation device 106 is not altered later. Therefore, when the failed functional units contained in functional unit set 1 increase, situations where no available connective relation for alteration is stored in connective relation storage 105 often occur, and therefore, there is a disadvantage in which the high reliability of the system can not be obtained. Further, there is also a disadvantage in which the capacity of connective relation storage 5 is consumed uselessly.

SUMMARY OF THE INVENTION

In order to overcome the aforementioned disadvantages, the present invention has been made, and accordingly, has an object to provide a high reliability system capable of generating connective relations which satisfy constraints related to the connective relations among the functional units such as the topology of the connective relations and operational timings, an apparatus and method for generating the connective relations, and a computer readable storage medium that stores a program containing instructions for realizing the method with a computer.

Another object of the present invention is to provide a high reliability system capable of reducing the amount of computation for generating the connective relation, an apparatus and method for generating the connective relation capable of reducing the amount of computation, and a computer readable storage medium that stores a program containing instructions for realizing the method with a computer.

Further object of the present invention is to provide a high reliability system capable of maintaining the high reliability even if failed functional units increase, an apparatus and method for generating a connective relation capable of maintaining the high reliability even if failed functional units increase, and a computer readable storage medium that stores a program containing instructions for realizing the method with a computer.

According a first aspect of the present invention, there is provided a high reliability system, which comprises: a functional unit set having a plurality of functional units, each of the functional units being capable of be connected with any other functional unit; a reliability storing means for storing a reliability of each functional unit contained in the functional unit set; a cost assigning means for assigning to each functional unit a reliability cost as a cost in accordance with the reliability stored in the reliability storing means; a cost storing means for storing the cost of each functional unit; a constraint storing means for storing constraints on connections of the functional units contained in the functional unit set; a connective relation generating means for generating a plurality of sets of connective relations of the functional units in the functional unit set in accordance with the costs of the functional units stored in the cost storing means and the constraints stored in the constraint storing means; a connective relation storing means for storing the plurality of sets of the connective relations of the functional units generated by the connective relation generating means; a failed functional unit detecting means for detecting a failed functional unit among the functional units contained in the functional unit set; a selecting means for selecting, among the sets of connective relations of the plurality of functional units stored in the connective relation storing means, a set not containing the failed functional unit detected by the failed functional unit detecting means; and an altering means for connecting the functional units in the functional unit set in accordance with the selected set of the connective relations of the functional units.

According to a second aspect of the present invention, there is provided a high reliability system, which comprises: a functional unit set having a plurality of functional units, each of the functional units being capable of be connected with any other functional unit; a cost assigning means for assigning a random cost as a cost to each functional unit contained in the functional unit set; a cost storing means for storing the cost of each functional unit; a constraint storing means for storing constraints on connections of the functional unit contained in the functional unit set; a connective relation generating means for generating a plurality of sets of connective relations of the functional units in the functional unit set in accordance with the costs of the functional units stored in the cost storing means and the constraints stored in the constraint storing means; a connective relation storing means for storing the plurality of sets of the connective relations of the functional units generated by the connective relation generating means; a failed functional unit detecting means for detecting a failed functional unit among the functional units contained in the functional unit set; a selecting means for selecting, among the sets of connective relations of the plurality of functional units stored in the connective relation storing means, a set not containing the failed functional unit detected by the failed functional unit detecting means; and an altering means for connecting the functional units in the functional unit set in accordance with the selected set of the connective relations of the functional units.

According to a third aspect of the present invention, there is provided a high reliability system, which comprises: a functional unit set having a plurality of functional units, each of the functional units being capable of be connected with any other functional unit; a cost assigning means for assigning to each functional unit a cost corresponding to connective relations of the functional units as a cost, the connective relations being stored in a connective relation storing means; a cost storing means for storing the cost of each functional unit; a constraint storing means for storing constraints on connections of functional units contained in the functional unit set; a connective relation generating means for generating a plurality of sets of connective relations of the functional units in the functional unit set in accordance with the costs of the functional units stored in the cost storing means and the constraints stored in the constraint storing means; a connective relation storing means for storing the plurality of sets of the connective relations of the functional units generated by the connective relation generating means; a failed functional unit detecting means for detecting a failed functional unit among the functional units contained in the functional unit set; a selecting means for selecting, among the sets of the connective relations of the plurality of functional units stored in the connective relation storing means, a set not containing the failed functional unit detected by the failed functional unit detecting means; and an altering means for connecting the functional units in the functional unit set in accordance with the selected set of the connective relations of the functional units.

The high reliability system according to any aspect may further comprise: a detecting means for detecting a functional unit in a predetermined state in the functional unit set; and a state cost assigning means for adding a predetermined cost to the cost of the functional unit detected by the detecting means.

The high reliability system according to any aspect may further comprise: a detecting means for detecting a functional unit in a predetermined state in the functional unit set; and a constraint adding means for storing in the constraint storing means an additional constraint to disable the functional unit detected by the detecting means.

According to a fourth aspect of the present invention, there is provided an apparatus for generating connective relations of functional units contained in a functional unit set, the each functional unit being capable of be connected with any other functional unit, which apparatus comprises: a reliability storing means for storing a reliability of each functional unit contained in the functional unit set; a cost assigning means for assigning to each functional unit a reliability cost as a cost in accordance with the reliability stored in the reliability storing means; a cost storing means for storing the cost of each functional unit; a constraint storing means for storing constraints on connections of the functional units contained in the functional unit set; and a connective relation generating means for generating a plurality of sets of connective relations of the functional units in the functional unit set in accordance with the costs of the functional units stored in the cost storing means and the constraints stored in the constraint storing means.

According to a fifth aspect of the present invention, there is provided an apparatus for generating connective relations of functional units contained in a functional unit set, the each functional unit being capable of be connected with any other functional unit, which apparatus comprises: a cost assigning means for assigning a random cost as a cost to each functional unit contained in the functional unit set; a cost storing means for storing the cost of each functional unit; a constraint storing means for storing constraints on connections of the functional unit contained in the functional unit set; and a connective relation generating means for generating a plurality of sets of connective relations of the functional units in the functional unit set in accordance with the costs of the functional units stored in the cost storing means and the constraints stored in the constraint storing means.

According to a sixth aspect of the present invention there is provided an apparatus for generating connective relations of functional units contained in a functional unit set, the each functional unit being capable of be connected with any other functional unit, which apparatus comprises: a cost assigning means for assigning to each functional unit a cost corresponding to connective relations of the functional units as a cost, the connective relations being stored in a connective relation storing means existing externally; a cost storing means for storing the cost of each functional unit; a constraint storing means for storing constraints on connections of functional units contained in the functional unit set; and a connective relation generating means for generating a plurality of sets of connective relations of the functional units in the functional unit set in accordance with the costs of the functional units stored in the cost storing means and the constraints stored in the constraint storing means.

The apparatus for generating a connective relation according to any aspect may further comprise: a detecting means for detecting a functional unit in a predetermined state in the functional unit set; and a state cost assigning means for adding a predetermined cost to the cost of the functional unit detected by the detecting means.

The apparatus for generating a connective relation according to any aspect may further comprises: a detecting means for detecting a functional unit in a predetermined state in the functional unit set; and a constraint adding means for storing in the constraint storing means an additional constraint to disable the functional unit detected by the detecting means.

Other features and advantages of the invention will be apparent from the following description of the preferred embodiments thereof.

BRIEF DESCRIPTION OF THE DRAWINGS

The present invention will be more fully understood from the following detailed explanation with reference to the accompanying drawings in which.

DETAILED DESCRIPTION OF THE PREFERRED EMBODIMENTS

Embodiments of the present invention will be explained below with reference to the accompanying drawings.

First Embodiment

Figure 1:
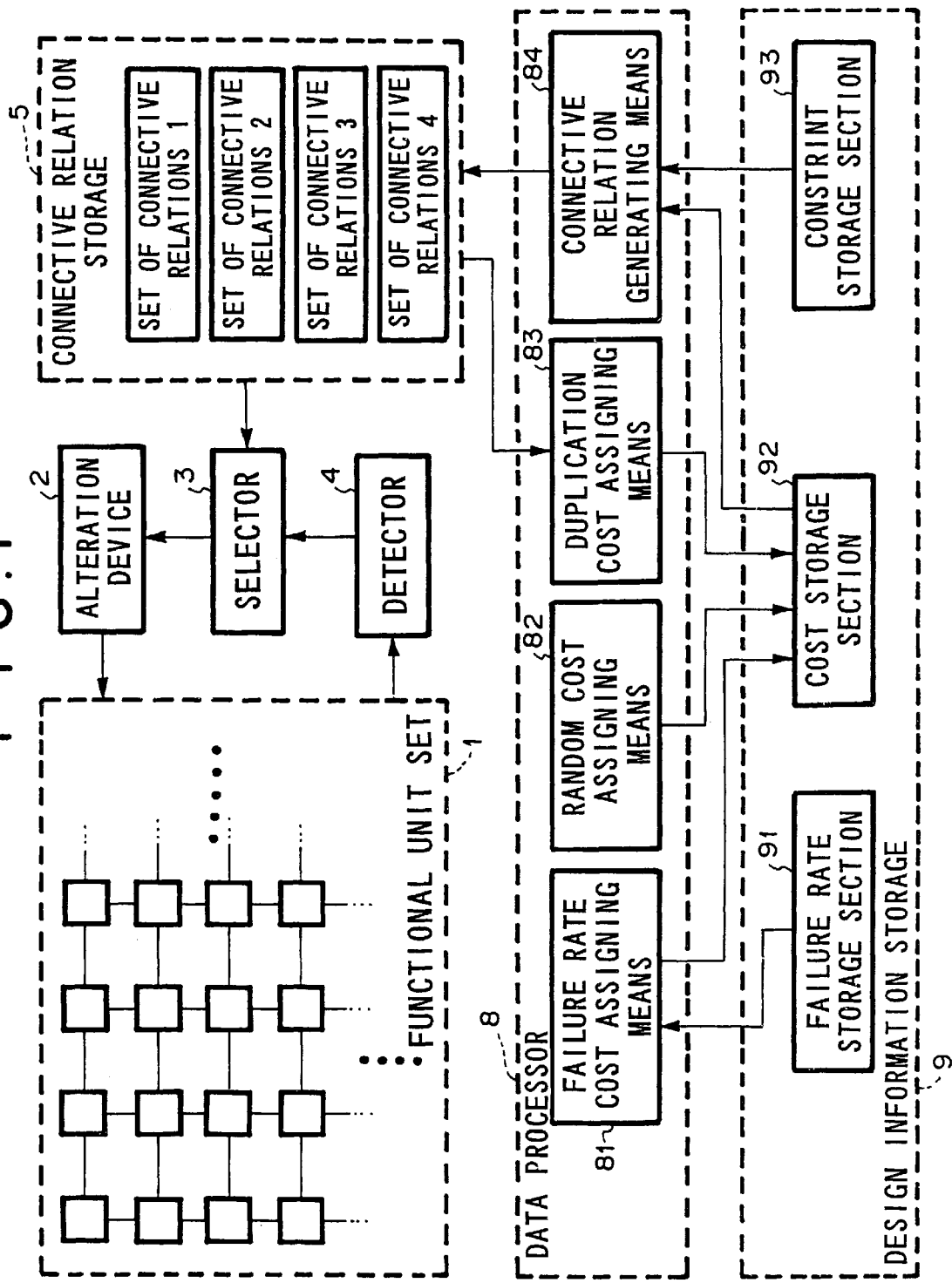
FIG. 1 is a block diagram showing an arrangement of a high reliability system according to a first embodiment of the present invention.

FIG. 1 is a block diagram showing an arrangement of a high reliability system according to the first embodiment of the present invention. As shown in the figure, this high reliability system comprises functional unit set 1, alteration device 2, selector 3, detector 4, connective relation storage 5, design information storage 9 and data processor 8.

Functional unit set 1 comprises mesh type parallel processors, for example, and includes a plurality of functional units such as a node and a link for connecting nodes.

Connective relation storage 5 comprises an external storage such as a magnetic disk device for storing a plurality of (as many as 4 in the figure for example) connective relations of the function units generated by later described connective relation generating means 84.

Detector 4 detects failed function units among the function units in function unit set 1, and provides information regarding the failed function unit to selector 3. Selector 3 selects a connective relation not containing the failed function units detected by detector 4 among the connective relations stored in connective relation storage 5. Alteration device 2 connects the function units to reconstruct the system based on the connective relation selected by selector 3.

Design information storage 9 comprises an external storage such as a magnetic disk device for storing data required for generating the connective relations, and includes failure rate storage section 91, cost storage section 92 and constraint storage section 93.

Failure rate storage section 91 previously stores failure rates of each of the function units contained in functional unit set 1. If failure rates of each of the function units are not known previously, arbitrary values assumed for the failure rates, or presumed failure rates, which is obtained by using the fact that the failure rate of the functional unit of the same material is equal to the result of subtracting one from an exponential function of a hardware amount, can be stored in failure rate storage section 91.

Cost storage section 92 stores the costs assigned by failure rate cost assigning means 81, random cost assigning means 82 and duplication cost assigning means 83 in data processor 8 as explained later.

Constraint storage section 93 previously stores the constraints imposed on the system, such as the topology of each functional unit and the operational timing in functional unit set 1. The constraints to be stored in constraint storage section 93 include that "a certain specific node must be connected with another specific node", for example.

Data processor 8 consists of a processor unit and a memory for storing a program to be executed by the processor unit, and includes each function of failure rate cost assigning means 81, random cost assigning means 82, duplication cost assigning means 83 and connective relation generating means 84.

Failure rate cost assigning means 81 reads the failure rate of each functional unit from failure rate storage section 91, and assigns a cost in accordance with the failure rate (hereinafter, referred to as a failure rate cost) to each functional unit. In more detail, failure rate cost assigning means 81 assigns a large failure rate cost to a functional unit having a large failure rate, and a small failure rate cost to a functional unit having a small failure rate. Failure rate cost assigning means 81 stores the thus assigned failure rate cost in cost storage section 92 as the cost of each functional unit.

Random cost assigning means 82 assigns a cost at random (hereinafter, referred to as a random cost) to each functional unit. Random cost assigning means 82 adds the assigned random cost to the cost stored in cost storage section 92 per every functional unit.

Duplication cost assigning means 83 reads out the connective relations of the functional units from connective relation storage 5, respectively, and examines the number of connective relations per every functional unit. Duplication cost assigning means 83 assigns a cost in accordance with the number of the used connective relations (hereinafter, referred to as a duplication cost) to each functional unit. In more detail, duplication cost assigning means 83 assigns a large cost to a functional unit having a large number of connective relations, and a small cost to a functional unit having a small number of the connective relations. Duplication cost assigning means 83 adds the duplication cost to the cost stored in cost storage section 92 per every functional unit.

Connective relation generating means 84 interprets the cost stored in cost storage section 92 as the cost of each functional unit, and selects a set of connective relations of the functional units from sets of the connective relations of the functional units which satisfy the constraints stored in constraint storage section 93 so that selected set generates the minimum sum of the costs of the functional units. Connective relation generating means 84 stores the generated connective relations in connective relation storage 5. If the connective relations of the functional units are stored in connective relation storage 5 to the maximum capacity, one of the already stored connective relations of the functional units is deleted, then a newly generated connective relation of the functional units is stored.

Figure 2:
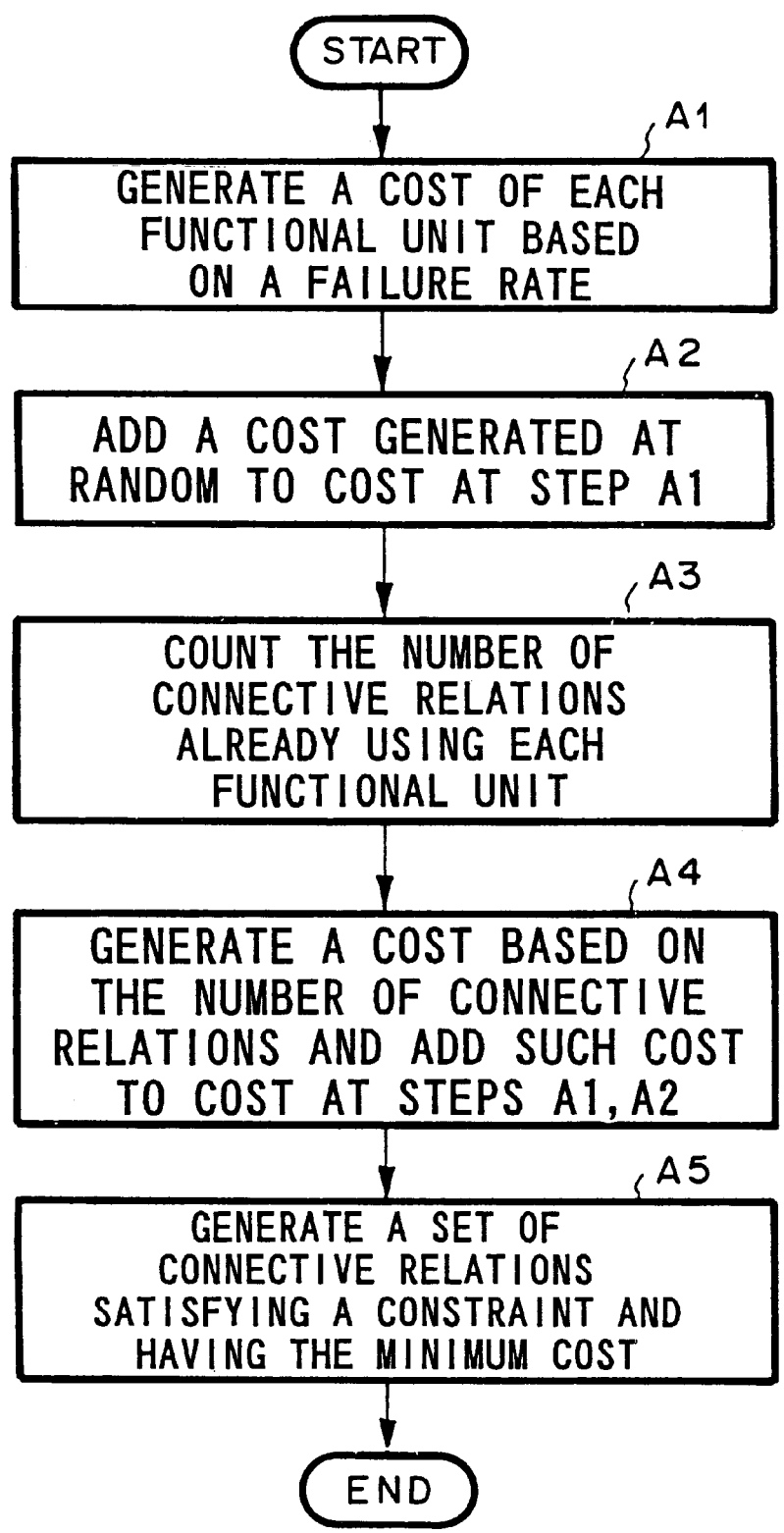
FIG. 2 a flow chart showing a process executed by a data processor in FIG. 1.

The process executed by data processor 8 will be explained below with reference to a flow chart of FIG. 2.

At the beginning the process, failure rate cost assigning means 81, in accordance with the failure rate of each functional unit stored in failure rate storage section 91, assigns a failure rate cost to each functional unit. Then, failure rate cost assigning means 81 stores the assigned failure rate cost in cost storage section 92 as the cost of each functional unit (step A1).

Next, random cost assigning means 82 generates a random cost per every functional unit, and assigns the random cost to each functional unit as the random cost. Then, random cost assigning means 82 adds the random cost assigned to each functional unit to the cost stored in cost storage section 92 (step A2).

Next, duplication cost assigning means 83 reads out the connective relations of the functional units from connective relation storage 5, respectively, and counts the number of connective relations per every functional unit (step A3). Further, duplication cost assigning means 83 assigns the duplication cost in accordance with the number of the counted connective relations to each functional unit. Then, duplication cost assigning means 83 adds the assigned duplication cost to the cost stored in cost storage section 92 per every functional unit (step A4).

Then, connective relation generating means 84 interprets the cost stored in cost storage section 92 as the cost of each functional unit, generates a set of connective relations of the functional units from the connective relations of the functional units which satisfy the constraints stored in constraint storage section 93 so that the selected set generates the minimum sum of the costs of the functional units, and stores the generated connective relations in connective relation storage 5 (step A5). Then, the process of this flow chart is finished.

A method for generating the connective relation of this embodiment will be explained below using a practical example.

Figure 3:
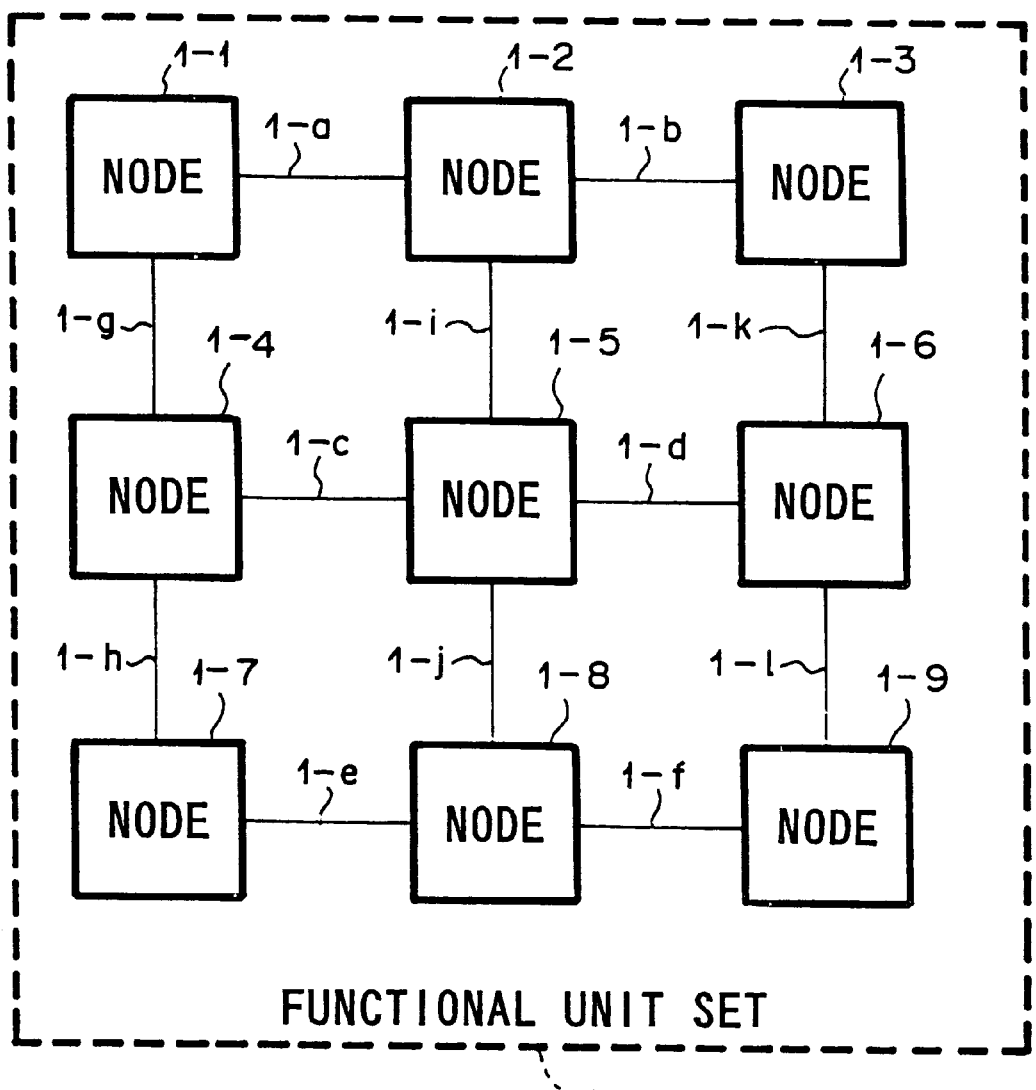
FIG. 3 is a first diagram showing an arrangement example of a functional unit set in FIG. 1.

In this example, functional unit set 1 is arranged as shown in FIG. 3. That is, functional unit set 1 is configured with 3×3 mesh type processors, and includes, as the functional units, nodes 1-1 through 1-9 arranged in a matrix and links 1-a through 1-l each for connecting a pair of adjacent nodes arranged in column direction or row direction among nodes 1-1 through 1-9. Although the numeral references are omitted in FIGS. 4–12 in order to clarify the figures, they are explained with the numeral references at the same positions as those in FIG. 4.

In addition, a failure rate of 2% for nodes 1-1 through 1-9 and a failure rate of 1% for links 1-a through 1-l are respectively stored in failure rate storage section 92. As the constraint of the connective relation of the functional units, "node 1 must be connected with node 1-9" is stored in constraint storage section 93. Three sets of of connective relations will be finally stored in connective relation storage 5, and no connective relation set is stored at the initial state.

Figure 4:
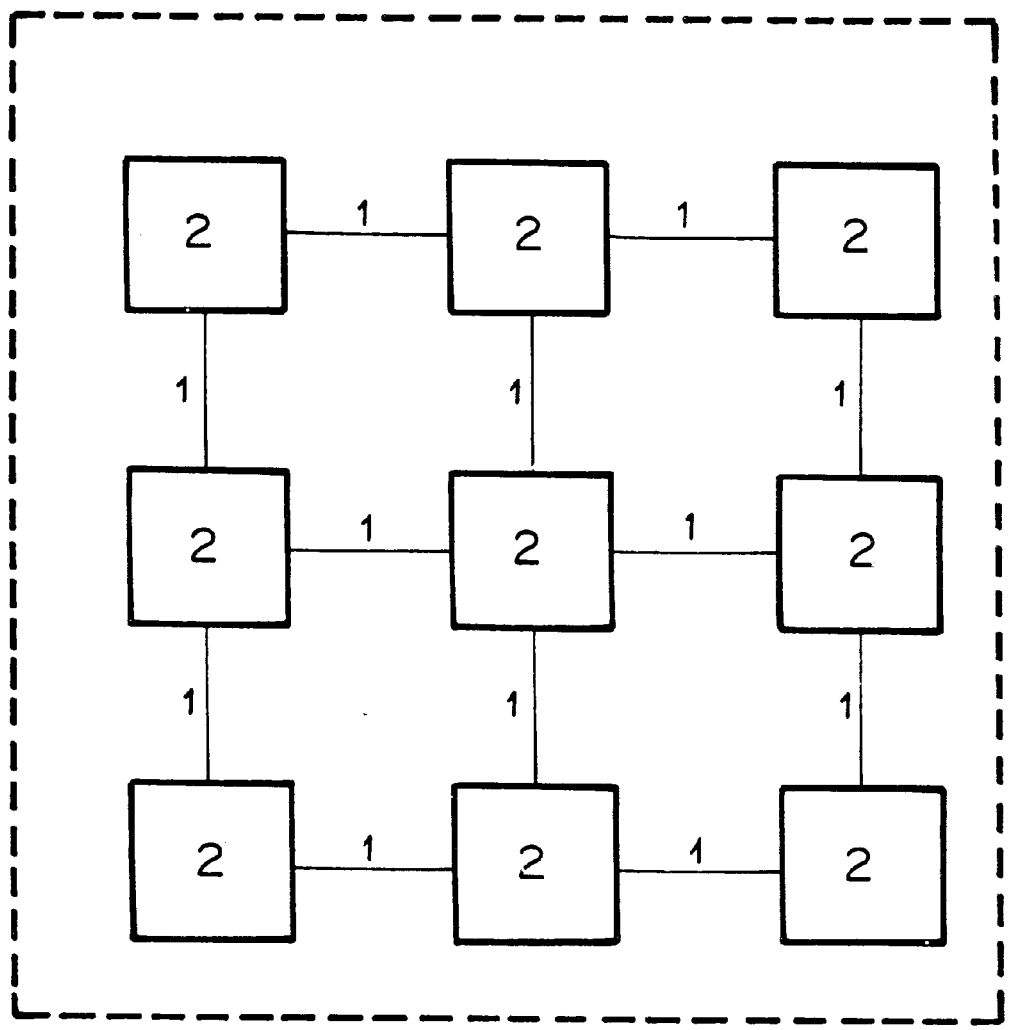
FIG. 4 is a second diagram showing a generation example of a connective relation of a functional unit according to the first embodiment of the present invention.

First, failure rate cost assigning means 81 reads out the failure rate costs of nodes 1-1 through 1-9 and links 1-a through 1-l from failure rate storage section 91. Then, failure rate cost assigning means 81 assigns the failure rate costs to the nodes and links in accordance with the failure rate and stores the failure rate costs in cost storage section 92. If it is assumed that the failure rate cost is equal to the failure rate (%), the costs of nodes 1-1 through 1-9 and links 1-a through 1-l stored in failure rate storage section 91 at this moment become those as shown in FIG. 4.

Figure 5:
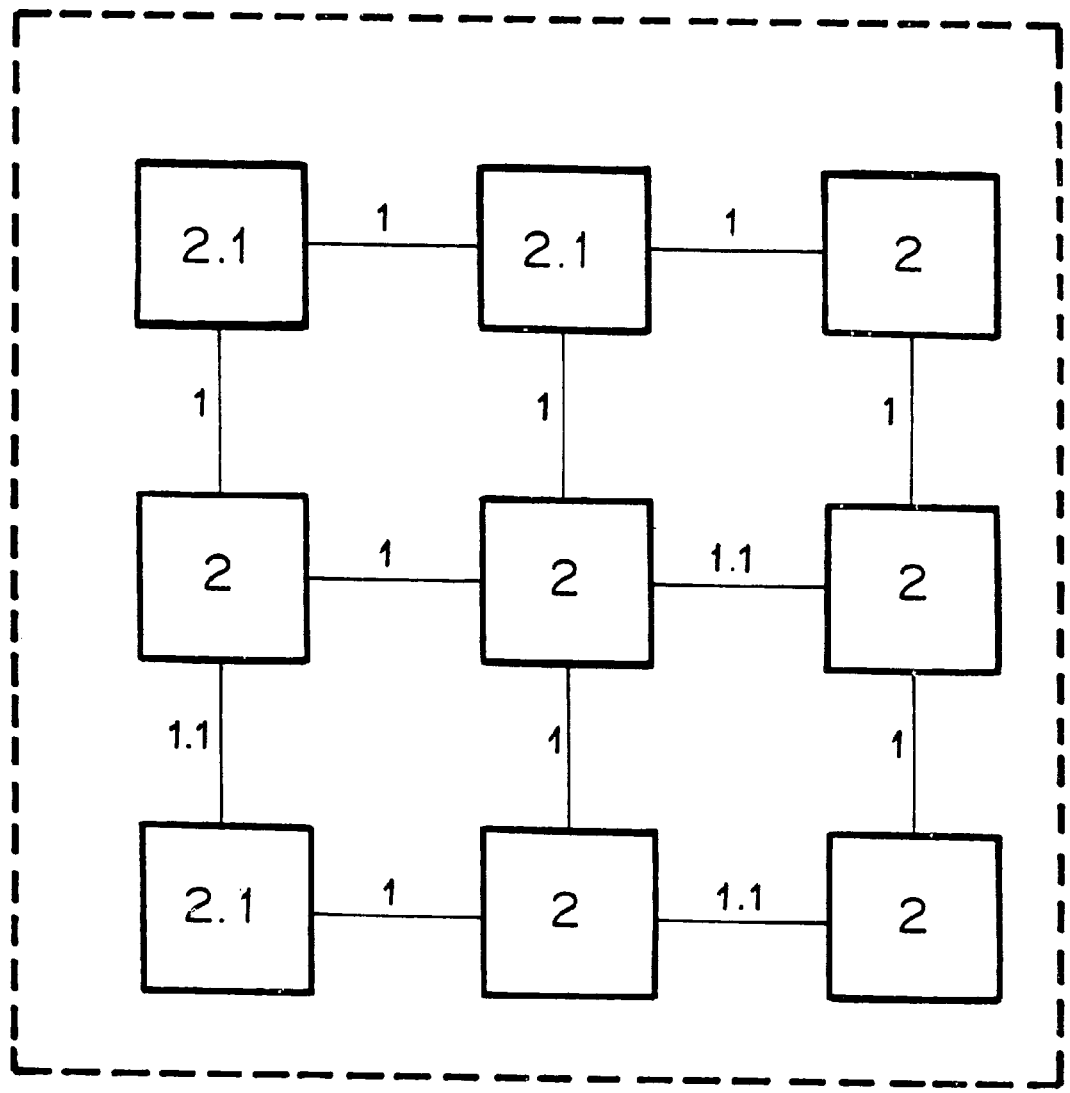
FIG. 5 is a third diagram showing a generation example of a connective relation of a functional unit according to the first embodiment of the present invention.

Next, random cost assigning means 82 assigns the random costs to nodes 1-1 through 1-9 and links 1-a through 1-l so as to add them to the costs stored in cost storage section 92. If, random cost assigning means 82 probabilistically assigns costs of 0 or 0.1 to the nodes and links as the random costs, the costs of nodes 1-1 through 1-9 and links 1-a through 1-l stored at this moment in cost storage section 92 become those as shown in FIG. 5.

Next, duplication cost assigning means 83 reads out the connective relations stored in connective relation storage 5, and counts the number of the connective relations per every functional unit. Then, duplication cost assigning means 83 assigns the duplication costs to the nodes and links in accordance with the counted value, and adds them to the costs stored in cost storage section 92. There is no connective relation stored in connective relation storage 5 at this moment, the costs of nodes 1-1 through 1-9 and links 1-*a* through 1-*l* stored in cost storage section 92 remain unchanged as shown in FIG. 5.

Figure 6:
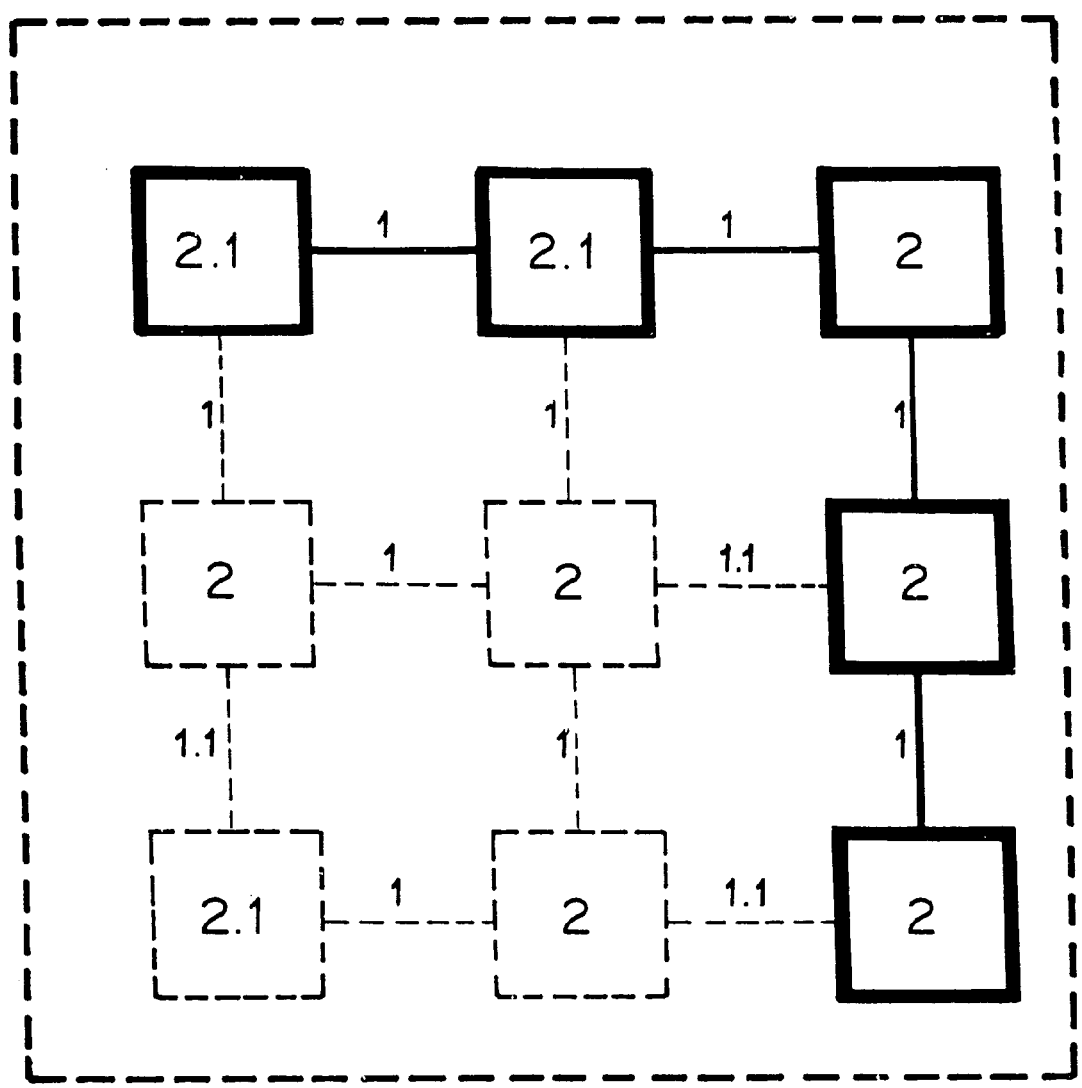
FIG. 6 is a fourth diagram showing a generation example of a connective relation of a functional unit according to the first embodiment of the present invention.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 6, and this connective relation is stored in connective relation storage 5.

Because only one set of connective relations is stored in connective relation storage 5 at this moment and the number of sets to be stored therein is not reached, the process steps for assigning the cost and generating the connective relations as explained above are repeated as follows.

Figure 7:
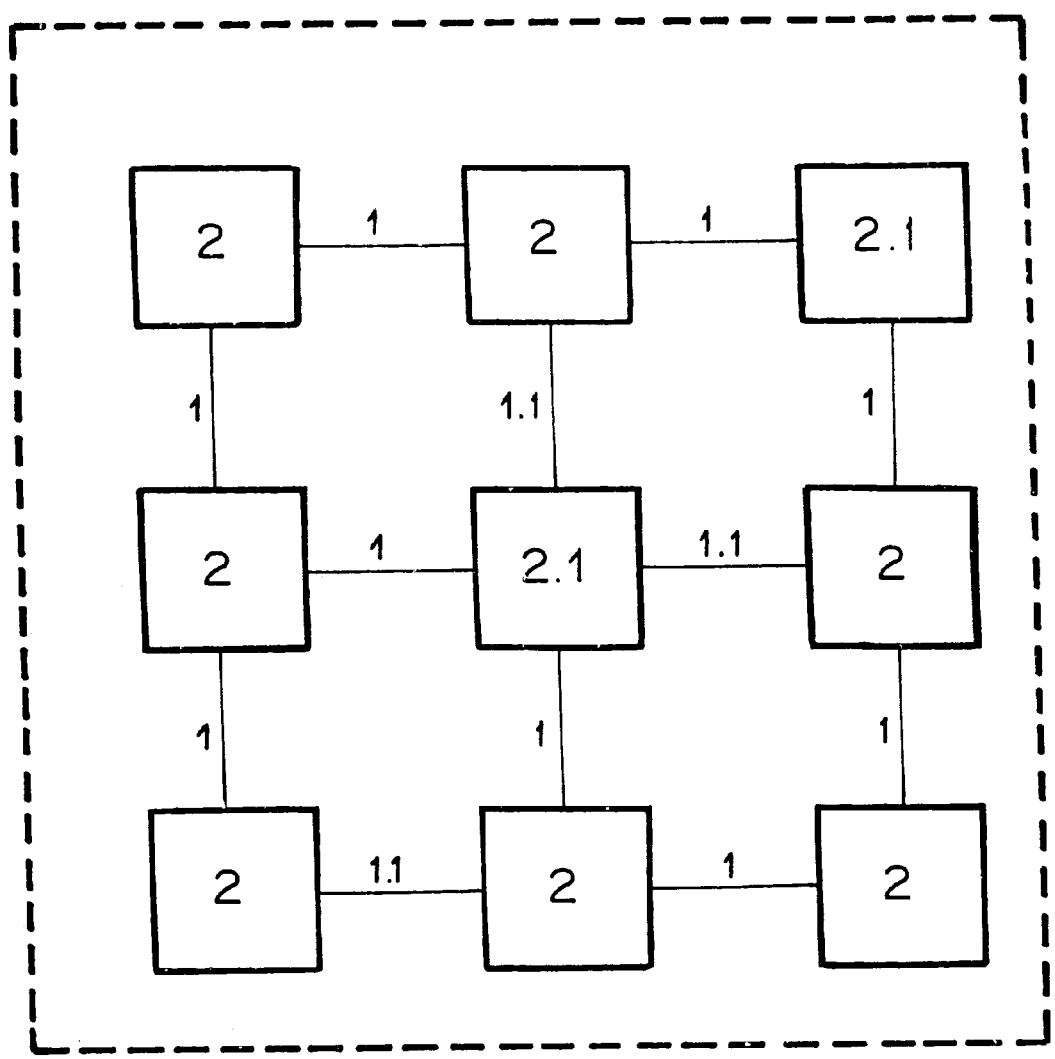
FIG. 7 is a fifth diagram showing a generation example of a connective relation of a functional unit according to the first embodiment of the present invention.

The assignment of the failure rate costs are the same as those in the above case, and the costs shown in FIG. 4 are stored in cost storage section 92. The assignment of the random costs are also the same as those in the above case, but 0 or 0.1 is generated probabilistically. Therefore, the costs of nodes 1-1 through 1-9 and links 1-*a* through 1-*l* which are stored in cost storage section 92 at this moment become those as shown in FIG. 7.

Figure 8:
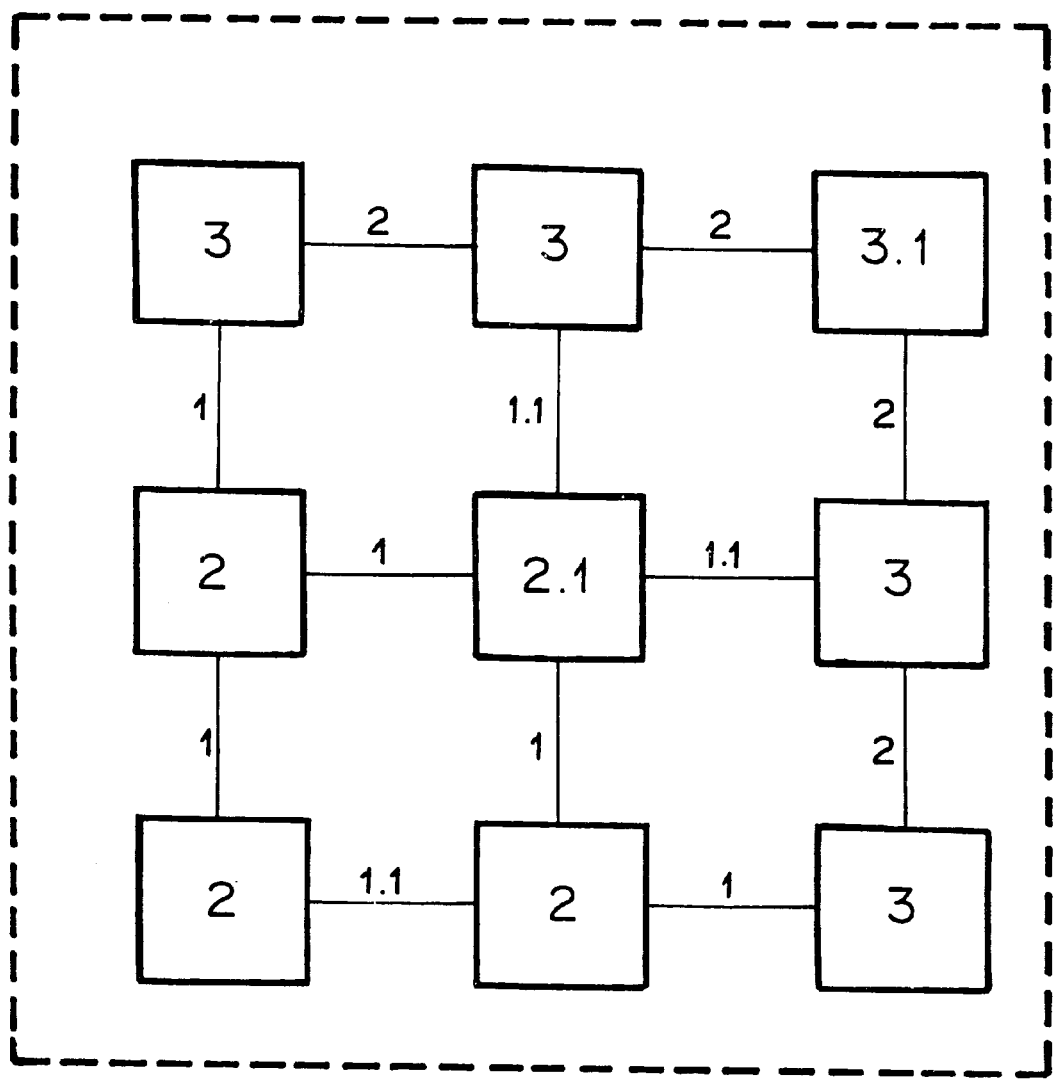
FIG. 8 is a sixth diagram showing a generation example of a connective relation of a functional unit according to the first embodiment of the present invention.

Next, duplication cost assigning means 83 reads out the connective relations stored in connective relation storage 5, and counts the number of connective relations per every functional unit. Then, duplication cost assigning means 83 assigns the duplication costs to the nodes and links in accordance with the counted numbers, and adds the duplication costs to the costs stored in cost storage section 92. At this moment, in connection with the connective relations stored in connective relation storage 5, nodes 1-1, 1-2, 1-3, 1-6 and 1-9 and links 1-*a*, 1-*b*, 1-*k* and 1-*l* have been used once, respectively. If a value of one is assigned to the nodes and links respectively as the duplication cost, the costs of nodes 1-1 through 1-9 and links 1-*a* through 1-*l* to be stored in cost storage section 92 become those as shown in FIG. 8, for example.

Figure 9:
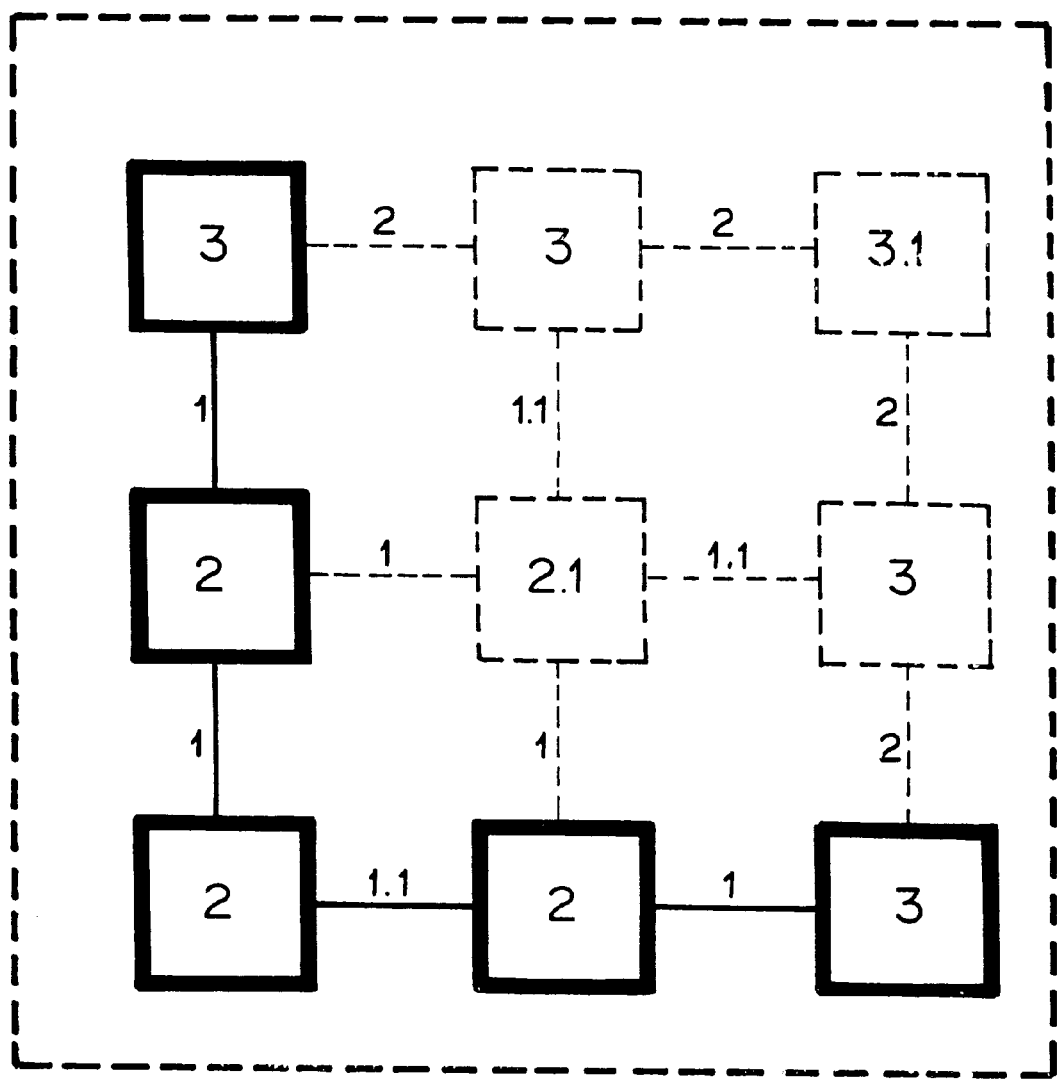
FIG. 9 is a seventh diagram showing a generation example of a connective relation of a functional unit according to the first embodiment of the present invention.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 9, and this connective relation is stored in connective relation storage 5.

Because only two sets of connective relations are stored in connective relation storage 5 at this moment and the number of sets to be stored therein is not reached, the process steps for assigning the cost and generating the connective relations as explained above are repeated as follows.

Figure 10:
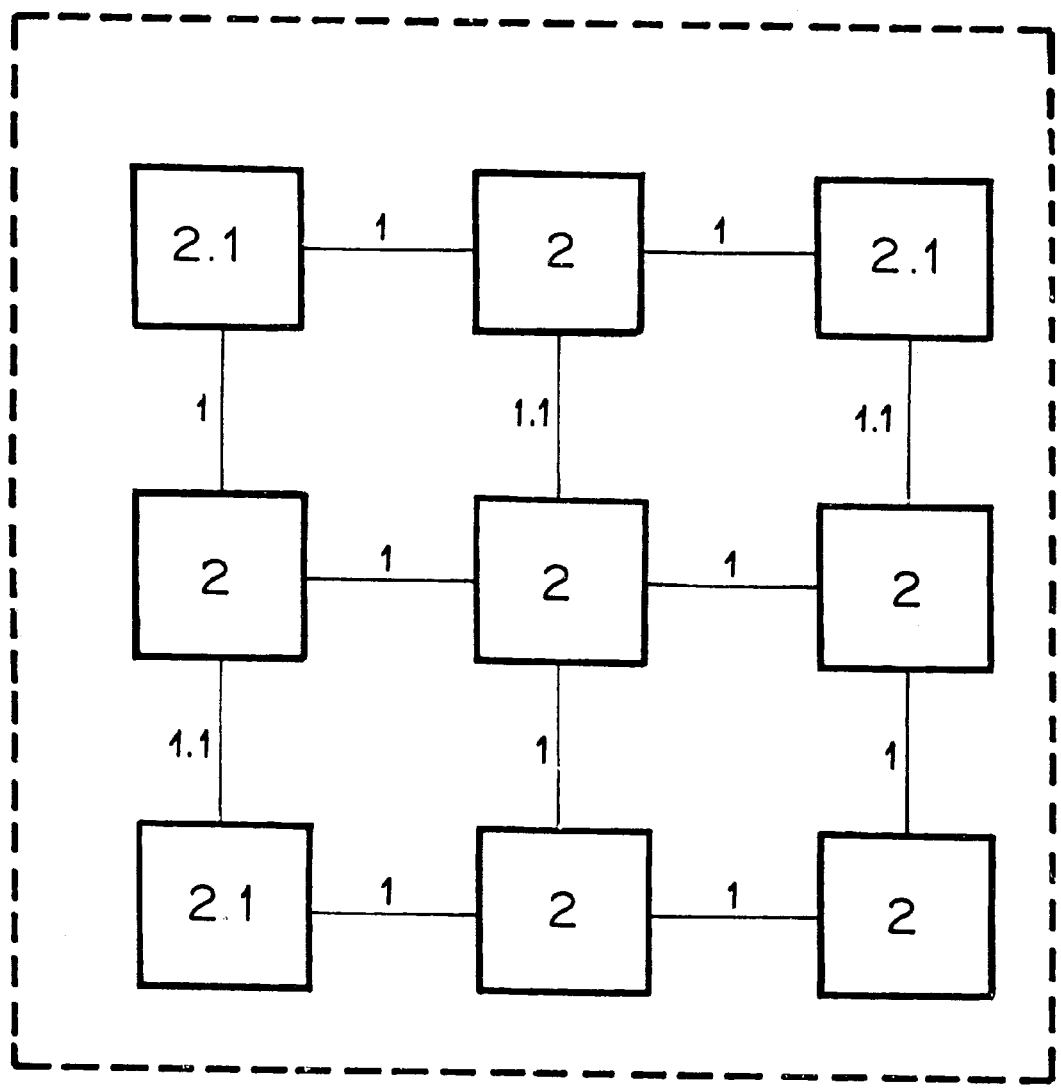
FIG. 10 is a eighth diagram showing a generation example of a connective relation of a functional unit according to the first embodiment of the present invention.

The assignment of the failure rate costs are the same as those in the above case, and the costs shown in FIG. 4 are stored in cost storage section 92. The assignment of the random costs are also the same as those in the above case, but 0 or 0.1 is generated probabilistically. Therefore, the costs of nodes 1-1 through 1-9 and links 1-*a* through 1-*l* which are stored in cost storage section 92 at this moment become those as shown in FIG. 10.

Figure 11:
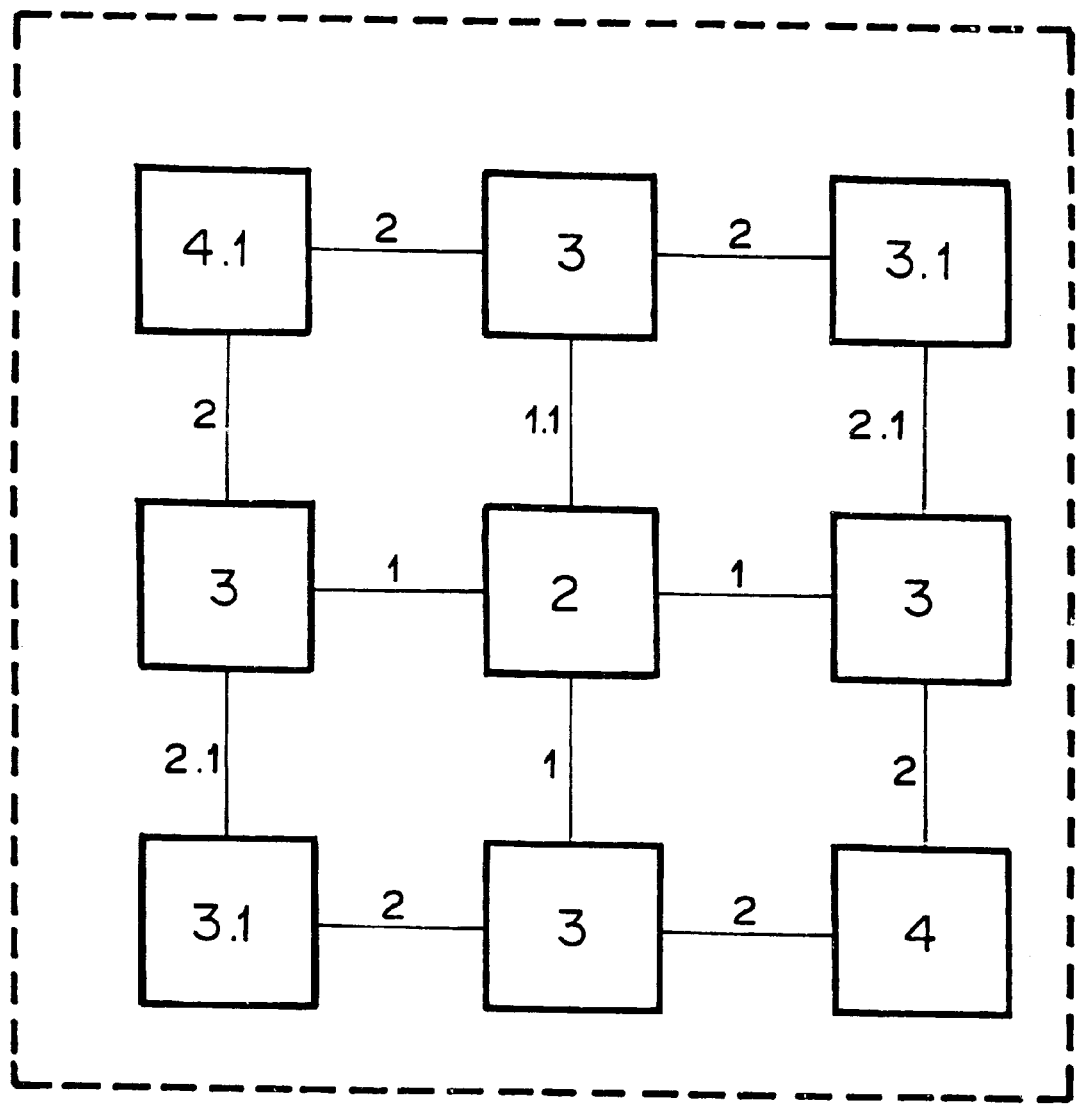
FIG. 11 is a ninth diagram showing a generation example of a connective relation of a functional unit according to the first embodiment of the present invention.

Next, duplication cost assigning means 83 reads out the connective relations from connective relation storage 5, and counts the number of connective relations per every functional unit. Then, duplication cost assigning means 83 assigns the duplication costs to the nodes and links in accordance with the counted numbers, and adds duplication costs to the costs stored in cost storage section 92. At this moment, in connection with the connective relations stored in connective relation storage 5, nodes 1-1 and 1-9 have been used twice, respectively. Nodes 1-2, 1-3, 1-4, 1-6, 1-7 and 1-8 and links 1-*a*, 1-*b*, 1-*e*, 1-*f*, 1-*g*, 1-*k*, 1-*h* and 1-*l* have been used once, respectively. If values of one or two corresponding to the number of usage occurences are assigned to the nodes and links as the duplication cost respectively, the costs of nodes 1-1 through 1-9 and links 1-*a* through 1-*l* to be stored in cost storage section 92 become those as shown in FIG. 11, for example.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 12, and this connective relation is stored in connective relation storage 5.

Because three sets of connective relations are stored in connective relation storage 5 at this moment and the number of sets to be stored therein has been reached, the process of generating connective relations and storing the connective relations in connective relation storage 5 executed by data processor 8 is completed.

Figure 12:
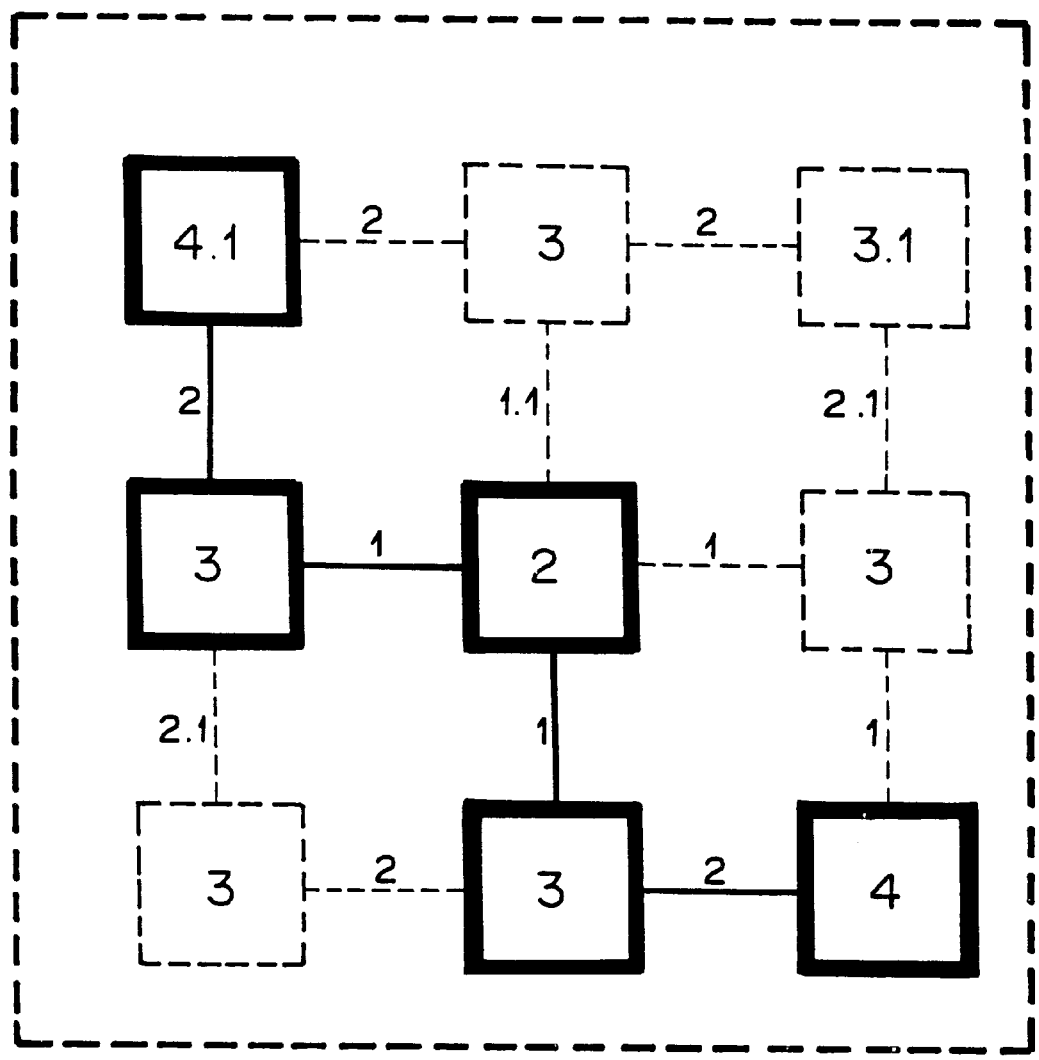
FIG. 12 is a tenth diagram showing a generation example of a connective relation of a functional unit according to the first embodiment of the present invention.

In the state where the three sets of connective relations are stored in connective relation storage 5, if detector 4 detects a failure of node 1-3, then selector 3 selects a set of connective relations which excludes node 1-3 as shown in FIG. 9 or FIG. 12. Alteration device 2 realizes the set of connective relations in functional unit set 1.

As explained above, in the high reliability system according to this embodiment, the constraints imposed on the system is stored in constraint storage section 93, and connective relation generating means 84 generates connective relations which satisfy this constrains. Therefore, the high reliability system according to this embodiment can generate the connective relations of the functional units contained in functional unit set 1 so as to satisfy the constraints imposed on the system.

Further, connective relation generating means 84 is sufficient to generate the connective relations which generate the minimum sum of the costs of the functional units stored in cost storage section 92, and can also perform the assignment of the costs to each functional unit with a simple computation. Therefore, in the high reliability system according to this embodiment, the computation complexity for generating the connective relations can be reduced.

[Second Embodiment]

Figure 13:
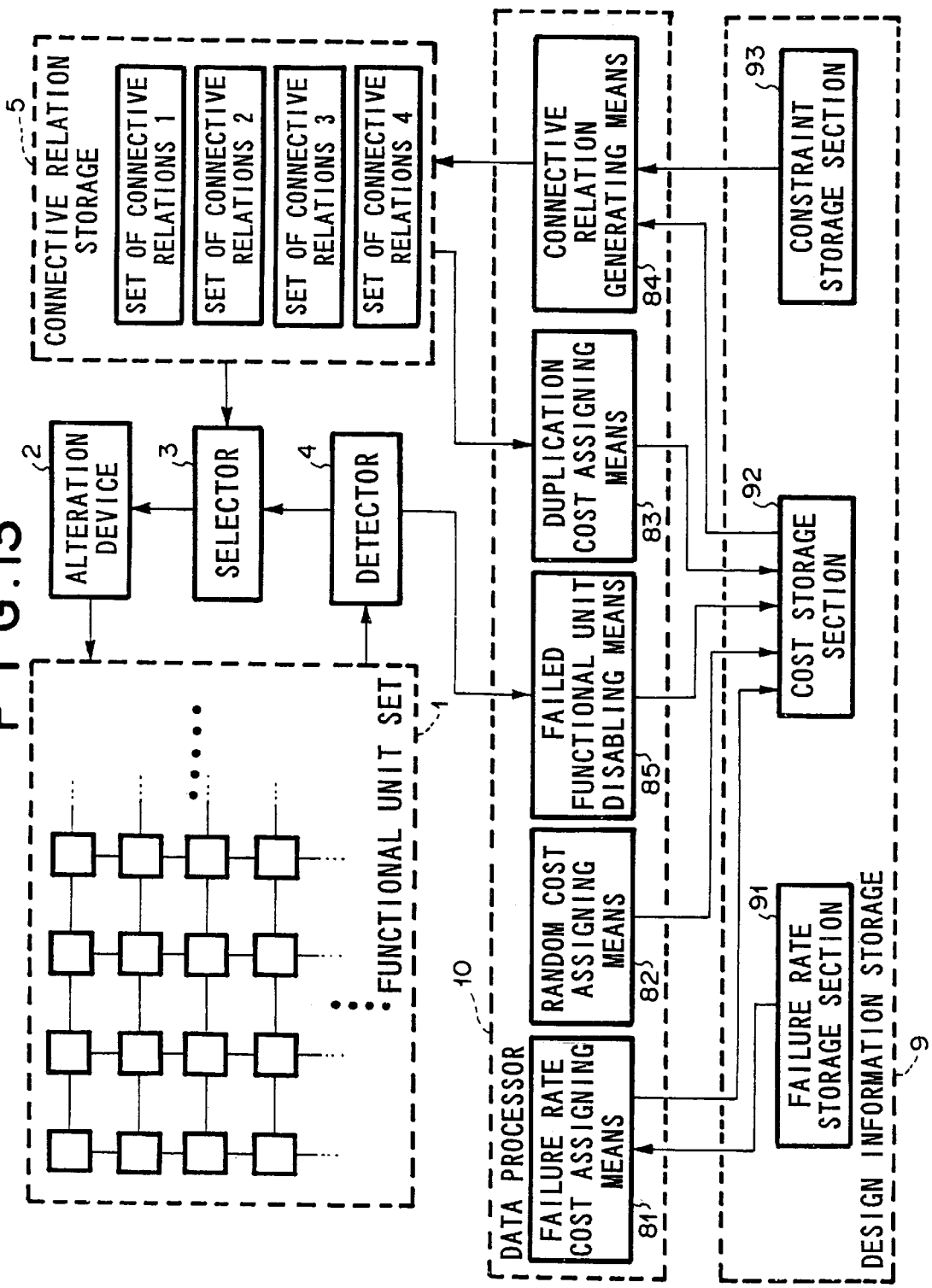
FIG. 13 is a block diagram showing an arrangement of a high reliability system according to a second embodiment of the present invention.

FIG. 13 is a block diagram showing an arrangement of a high reliability system according to the second embodiment of the present invention. This high reliability system differs from the high reliability system according to the first embodiment in that data processor 10 further comprises failed functional unit disabling means 85 in addition to each means of data processor 8 of FIG. 1.

Failed functional unit disabling means 85 receives information regarding the failed functional units from detector 4, and assigns to the failed functional units a sufficiently larger cost (hereinafter referred to as a failed cost) than the cost assigned by failure rate cost assigning means 81 or random cost assigning means 82. Failed functional unit disabling means 85 adds the assigned failed cost to the cost of the corresponding functional units stored in cost storage section 92.

Figure 14:
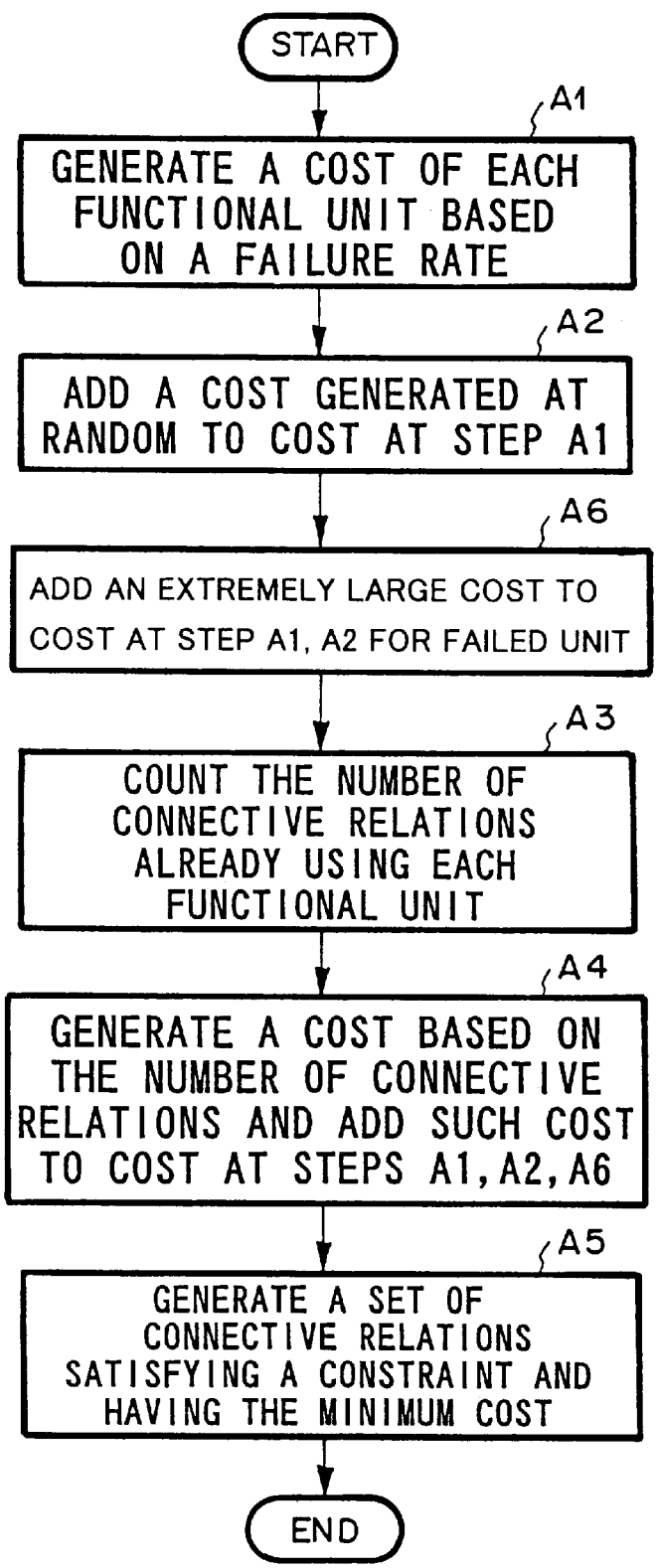
FIG. 14 a flow chart showing a process executed by a data processor in FIG. 13.

The process executed by data processor 10 of FIG. 13 in this embodiment will be explained below with reference to a flow chart of FIG. 14.

First, similarly to the first embodiment, failure rate cost assigning means 81 assigns a failure rate cost to each functional unit (one out of nodes and links) in accordance with the failure rate of each functional unit (step A1). Further, random cost assigning means 82 assigns a random cost to each functional unit, and adds the random cost to the cost of each functional unit (step A2).

Next, failed functional unit disabling means 85 receives information regarding the failed functional units from detector 4, and assigns the failed cost to the failed functional units indicated by the received information. Then, failed functional unit disabling means 85 adds the assigned failed cost to the cost of the corresponding functional units stored in cost storage section 92 (step A6).

Further, similarly to the first embodiment, duplication cost assigning means 83 counts the number of the connective relations which use each functional unit (step A3), assigns a duplication cost to each functional unit so as to add the duplication cost to the cost of each functional unit (step A4). Then, similarly to the first embodiment, connective relation generating means 84 generates connective relations in accordance with the costs stored in cost storage section 92 and the constraints stored in constraint storage section 93, and stores the connective relations in connective relation storage (step A5). Then, the process of this flow chart is completed.

A method for generating the connective relations of this embodiment will be explained below using a practical example.

Also in this example, similarly to the practical example of the first embodiment, functional unit set 1 is arranged as shown in FIG. 3. The contents of failure rate storage section 91 and constraint storage section 93 are the same as those in the practical example of the first embodiment. The number of sets of connective relations to be stored in connective relation storage 5 are also three. Further, it is assumed that a failure occurs at node 1-7 in the following example.

First, failure rate cost assigning means 81 assigns failure rate costs to nodes 1-1 through 1-9 and links 1-a through 1-l, and stores the failure rate costs in cost storage section 92. At this moment, the costs of nodes 1-1 through 1-9 and links 1-a through 1-l stored in cost storage section 92 becomes those as shown in FIG. 4 similarly to the practical example of the first embodiment. Next, random cost assigning means 82 assigns random costs to nodes 1-1 through 1-9 and links 1-a through 1-l so as to update costs thereof. At this moment, the costs of nodes 1-1 through 1-9 and links 1-a through 1-l stored in cost storage section 92 becomes those as shown in FIG. 5, for example, similarly to the practical example of the first embodiment.

Figure 15:
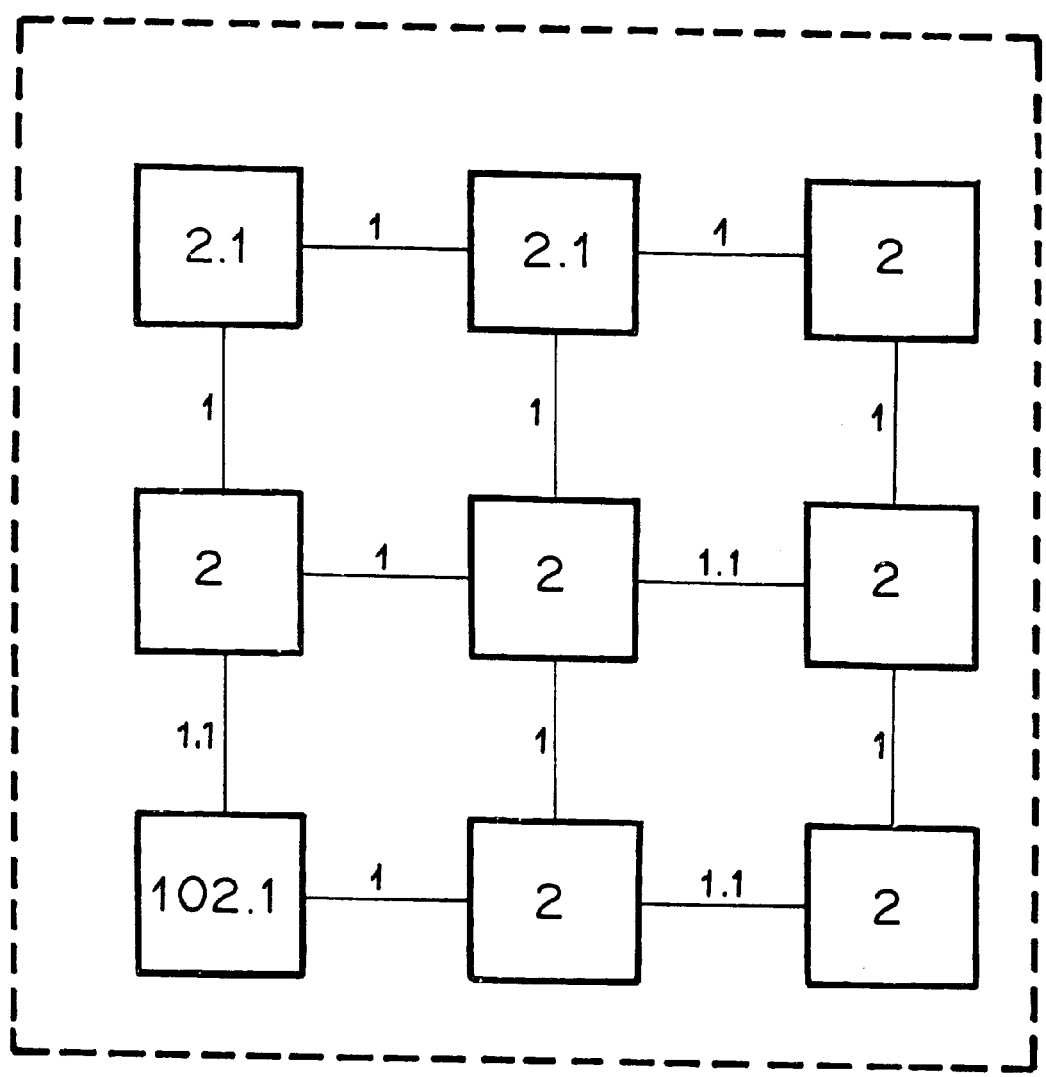
FIG. 15 is a first diagram showing a generation example of a connective relation of a functional unit according to the second embodiment of the present invention.

Next, failed functional unit disabling means 85 assigns, for example, 100 as a large failed cost to the failed node 1-7, and adds the failed cost to the cost stored in cost storage section 92. At this moment, the costs of nodes 1-1 through 1-9 and links 1-a through 1-l stored in cost storage section 92 becomes those as shown in FIG. 15, for example.

Next, duplication cost assigning means 83 assigns a duplication cost to each functional unit. At this moment, as there is no connective relation stored in connective relation storage 5, the costs of nodes 1-1 through 1-9 and links 1-a through 1-l stored in cost storage section 92 remain unchanged as shown in FIG. 15.

Figure 16:
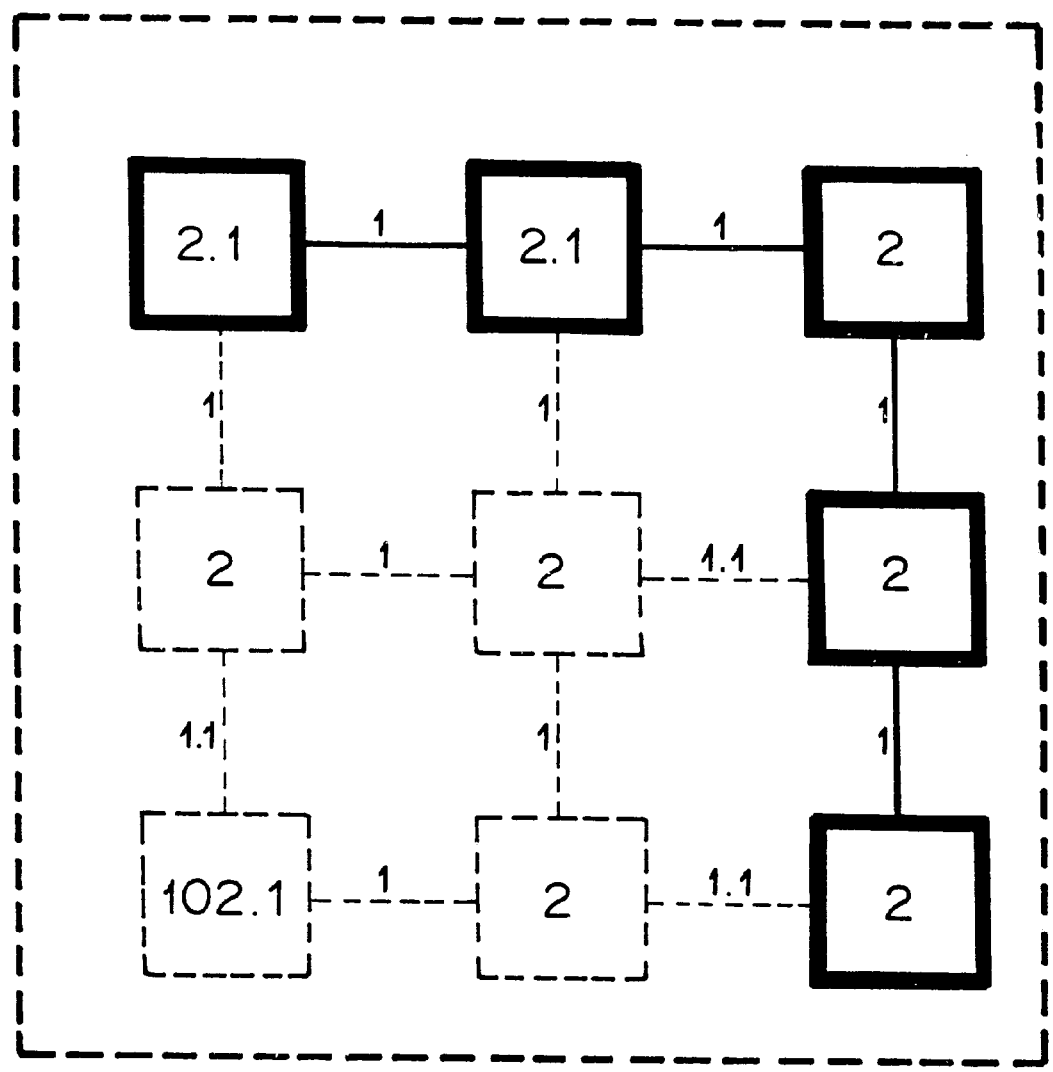
FIG. 16 is a second diagram showing a generation example of a connective relation of a functional unit according to the second embodiment of the present invention.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 16, and this connective relation is stored in connective relation storage 5.

Because only one set of connective relations is stored in connective relation storage 5 at this moment and the number of sets to be stored therein is not reached, the process steps for assigning the cost and generating the connective relations as explained above are repeated as follows.

Figure 17:
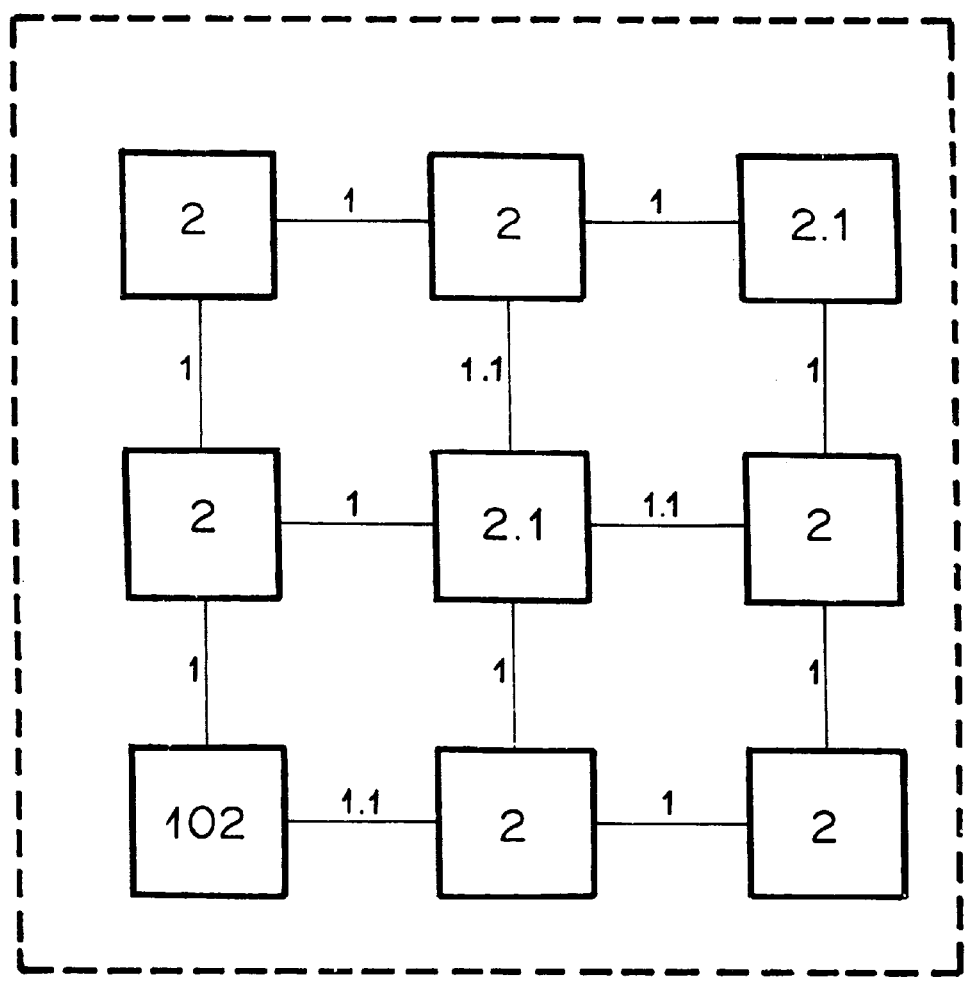
FIG. 17 is a third diagram showing a generation example of a connective relation of a functional unit according to the second embodiment of the present invention.

The process steps performed until the assignment of the failed cost are the same as those in the above case except that random costs to be assigned practically varies. The costs of nodes 1-1 through 1-9 and links 1-a through 1-l which are stored in cost storage section 92 at this moment become those as shown in FIG. 17, for example.

Figure 18:
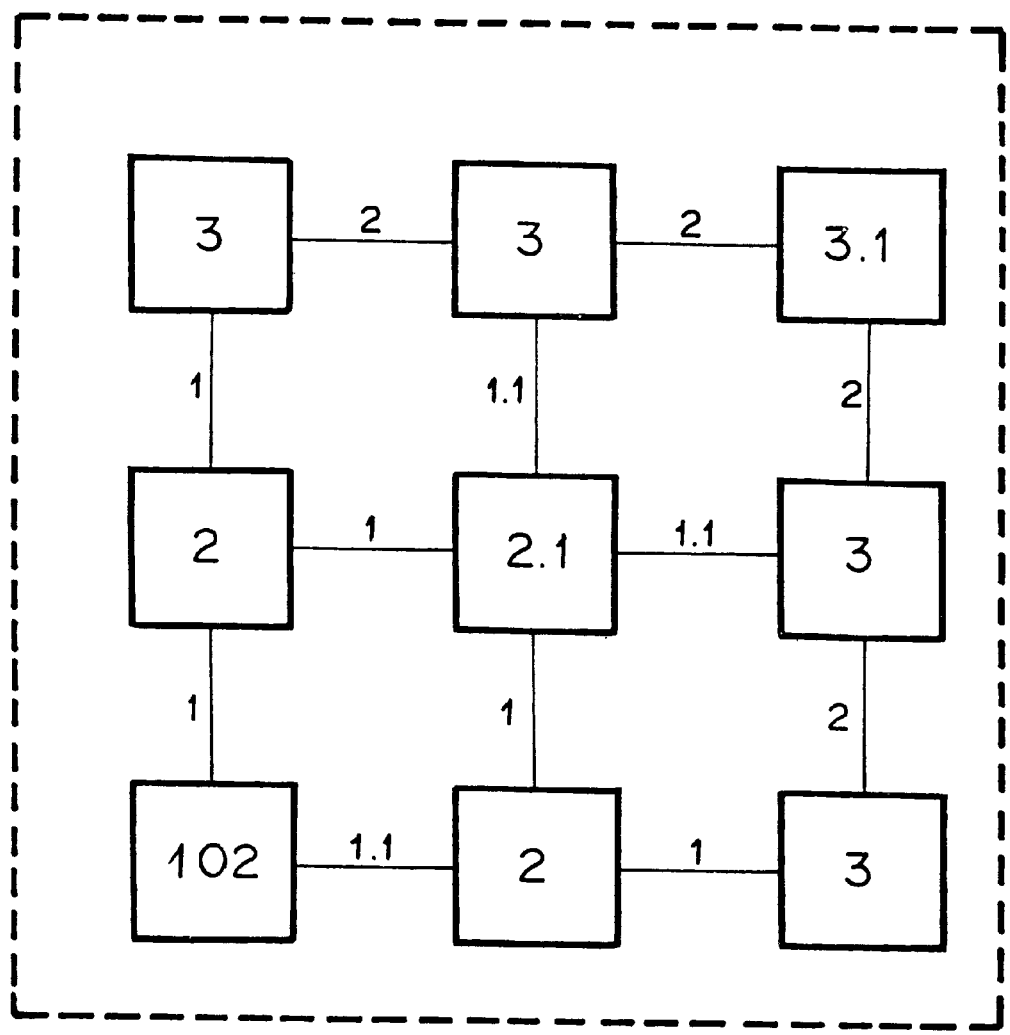
FIG. 18 is a fourth diagram showing a generation example of a connective relation of a functional unit according to the second embodiment of the present invention.

Next, duplication cost assigning means 83 reads out the connective relations stored in connective relation storage 5, and counts the number of connective relations per every functional unit. Then, duplication cost assigning means 83 assigns duplication costs to functional units in accordance with the counted numbers, and adds the duplication costs to the costs stored in cost storage section 92. At this moment, in connection with the connective relations stored in connective relation storage 5, nodes 1-1, 1-2, 1-3, 1-6 and 1-9 and links 1-a, 1-b, 1-k and 1-l have been used once, respectively. If a value of one is assigned to the nodes and links respectively as the duplication cost, the costs of nodes 1-1 through 1-9 and links 1-a through 1-l to be stored in cost storage section 92 become those as shown in FIG. 18, for example.

Figure 19:
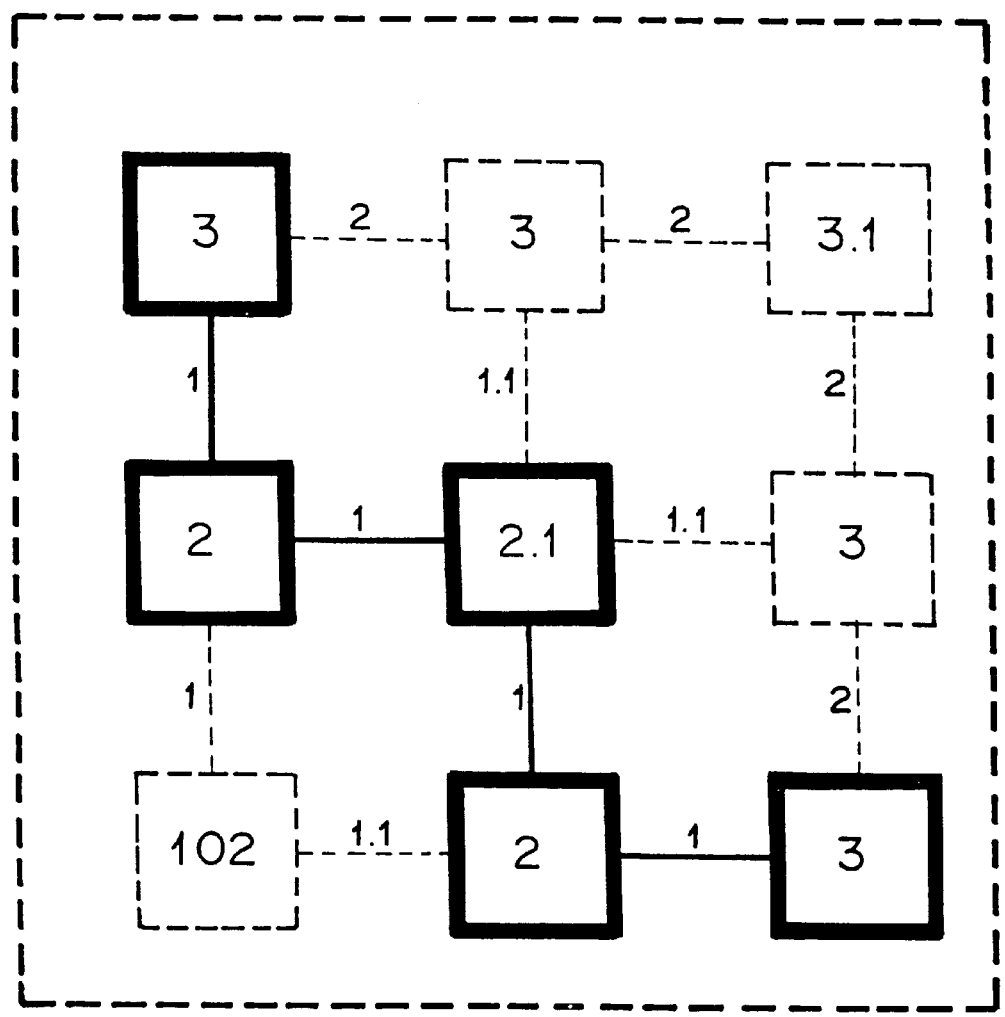
FIG. 19 is a fifth diagram showing a generation example of a connective relation of a functional unit according to the second embodiment of the present invention.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 19, and this connective relation is stored in connective relation storage 5.

Because only two sets of connective relations are stored in connective relation storage 5 at this moment and the number of sets to be stored therein is not reached, the process steps for assigning the cost and generating the connective relations as explained above are repeated as follows.

Figure 20:
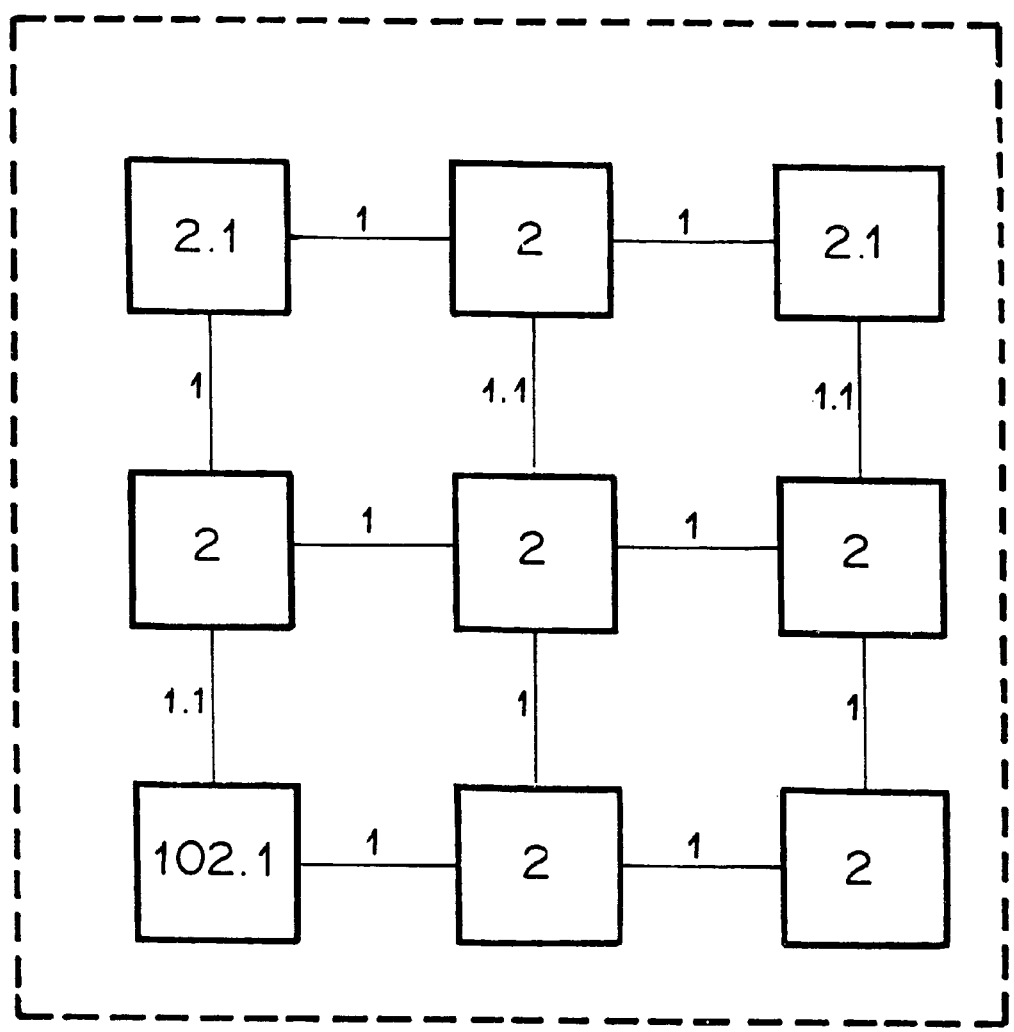
FIG. 20 is a sixth diagram showing a generation example of a connective relation of a functional unit according to the second embodiment of the present invention.

The process steps performed until the assignment of the failed cost are the same as those in the above case except that random costs to be assigned practically varies. The costs of nodes 1-1 through 1-9 and links 1-a through 1-l which are stored in cost storage section 92 at this moment become those as shown in FIG. 20, for example.

Figure 21:
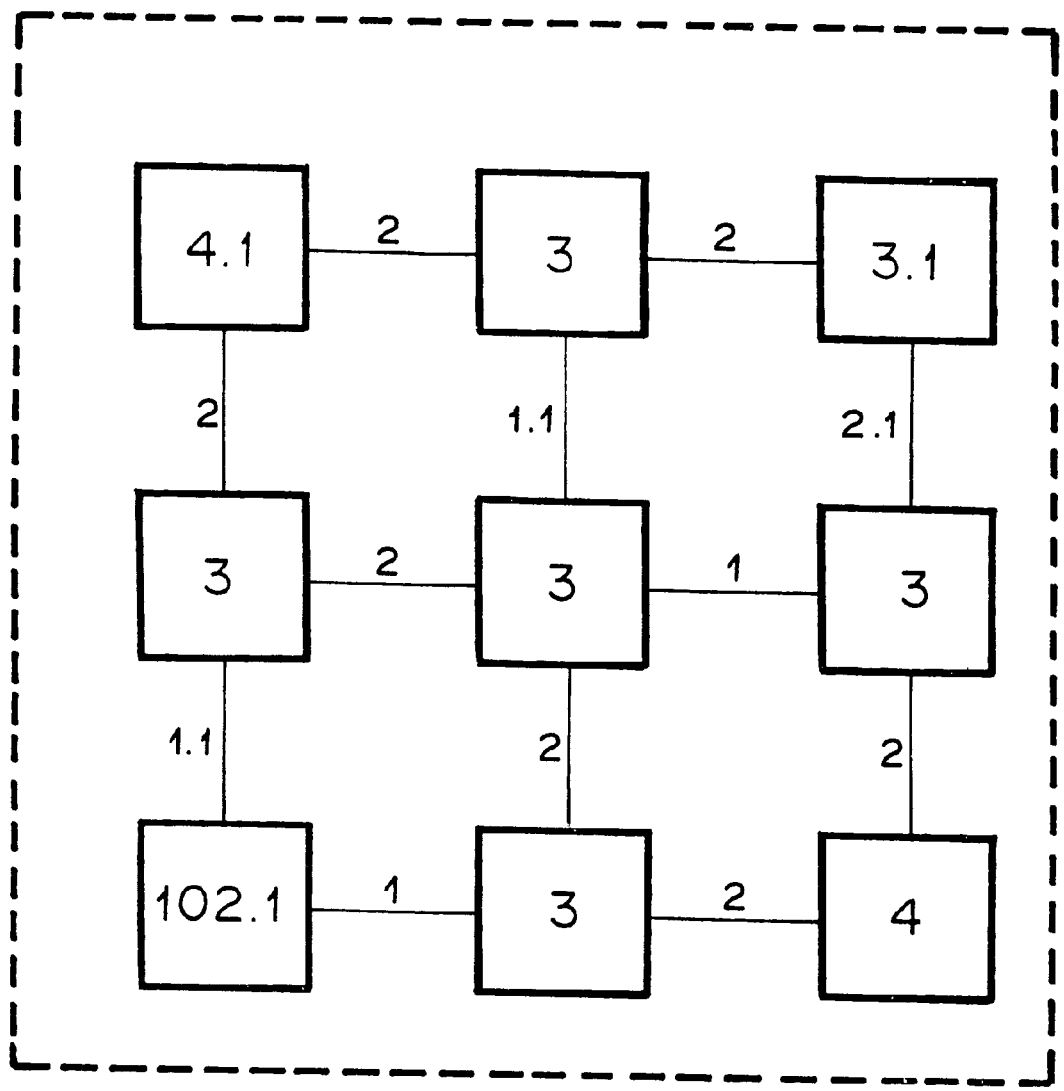
FIG. 21 is a seventh diagram showing a generation example of a connective relation of a functional unit according to the second embodiment of the present invention.

Next, duplication cost assigning means 83 reads out the connective relations stored in connective relation storage 5, and counts the number of connective relations per every functional unit. Then, duplication cost assigning means 83 assigns the duplication costs to functional units in accordance with the counted number, and adds the duplication costs to the costs stored in cost storage section 92. At this moment, in connection with the connective relations stored in connective relation storage 5, nodes 1-1 and 1-9 have been used twice, respectively. Nodes 1-2, 1-3, 1-4, 1-5, 1-6 and 1-8 and links 1-a, 1-b, 1-c, 1-f, 1-g, 1-k, 1-j and 1-l have been used once, respectively. If a value of one or two is assigned to the nodes and links respectively as the duplication cost, the costs of nodes 1-1 through 1-9 and links 1-a through 1-l to be stored in cost storage section 92 become those as shown in FIG. 21, for example.

Figure 22:
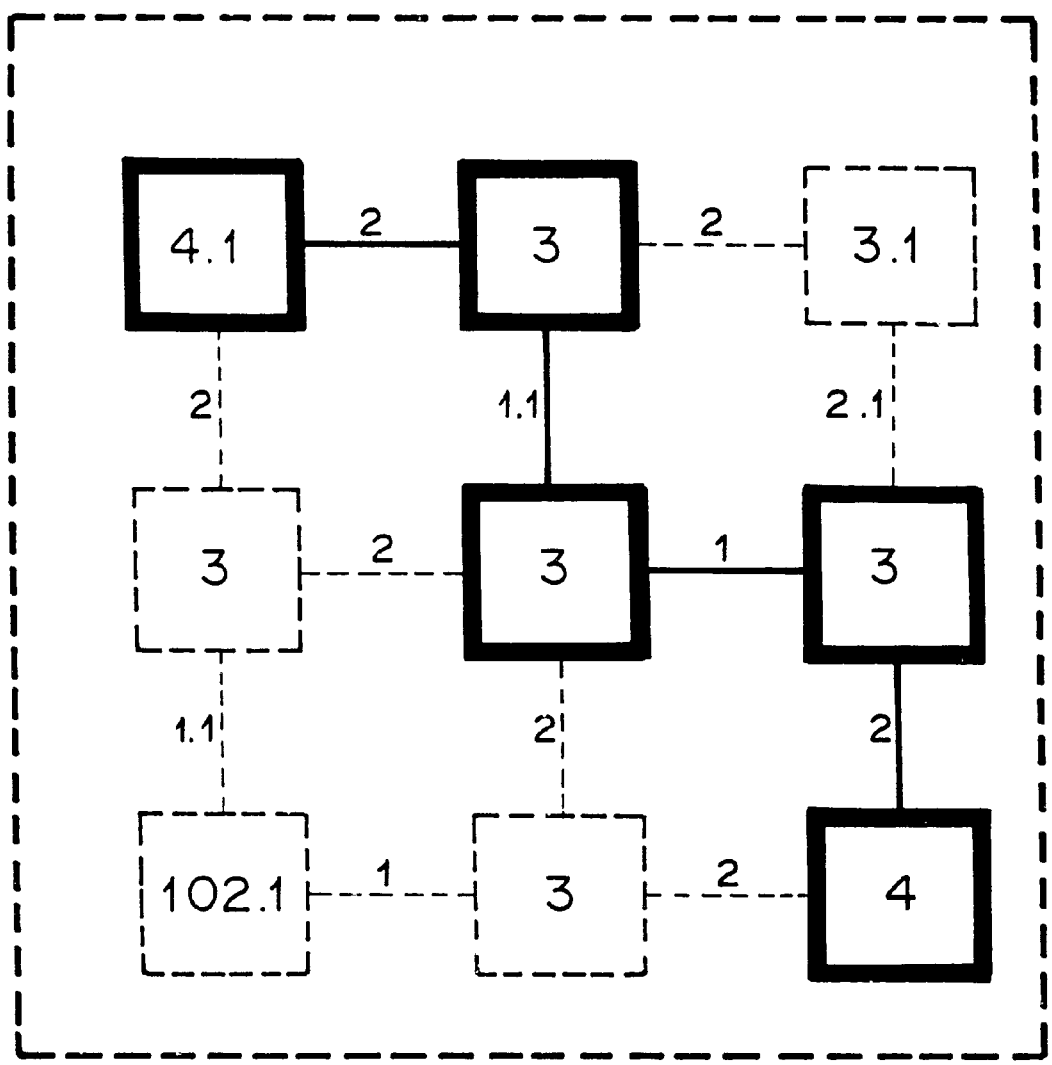
FIG. 22 is a eighth diagram showing a generation example of a connective relation of a functional unit according to the second embodiment of the present invention.

Next, connective relation generating means 84 generates a set of connective relations which costs the minimum in terms of the sum of costs of the nodes and links among sets of connective relations which satisfy the constraint condition, "node 1-1 must be connected to node 1-9", stored in constraint storage section 93. An example of the selected set of connective relations is shown in FIG. 22, and this connective relation is stored in connective relation storage 5. Because three sets of connective relations are stored in connective relation storage 5 at this moment and the number of sets to be stored therein has been reached, the process of generating connective relations and storing the connective relations in connective relation storage 5 executed by data processor 8 is completed.

In the state where three sets of connective relations are stored in connective relation storage 5, if detector 4 detects a failure of node 1-3, then selector 3 selects a set of the connective relations which exclude node 1-3 as shown in FIG. 19 or FIG. 22. Alteration device 2 realizes the set of connective elations in functional unit set 1.

As explained above, in the high reliability system according to this embodiment, since failed functional unit disabling means 85 assigns a large cost to the failed functional units, connective relation generating means 84 does not generate a connective relation which includes the failed functional units. Therefore, in the high reliability system according to this embodiment, there is an effect in which a high reliability can be obtained even when the number of the failed functional units increases, in addition to the effects of the high reliability system according to the first embodiment.

[Modified Embodiment]

The present invention is not limited within the above embodiments but can be modified and applied to various configurations. Modified embodiments according to the present invention will be explained below.

In the above first and second embodiments, the mesh type parallel processors are exemplified as functional unit set 1. However, any topology which connects functional units may be a target of the present invention as long as the topology is so configured to connect each functional unit with any other functional unit. Further, the functional unit contained in functional unit set 1 is not limited to the node and the link between the nodes as long as the above condition imposed to the topology can be satisfied by the functional unit. Examples of functional unit set 1 include a semiconductor device such as WSI (Wafer Scale Integration) and FPGA (Field Programmable Gate Array) and a telecommunication network. In a case where the present invention is applied to the telecommunication network, stoppage of a host due to maintenance may be regarded as a fault of a functional unit.

In the first and second embodiments, the failure rate of each functional unit in functional unit set 1 is stored in failure rate storage section 91, and failure rate cost assigning means 81 assigns the cost to each functional unit in accordance with the failure rate of each functional unit. However, it may adapted a configuration in which failure rate storage section 91 stores the failure rate cost of each functional unit instead of the failure rate thereof and failure rate cost assigning means 81 directly assigns the failure rate cost read from failure rate storage section 91 to each functional unit. Further, MTBF (Mean Time Between Failures) and MTTR (Mean Time To Repair) may be adapted for determining the cost of each functional unit instead of the failure rate of each functional unit. In this case, design information storage 9 comprises a storage section for storing an availability, i.e., (MTBF/(MTBF+MTTR), of each functional unit instead of failure rate storage section 91, for example.

In the first and second embodiments, a failure rate cost, random cost, (a failed cost), and a duplication cost are summed up in this written order in cost storage section 92. However, an order for the summation may be arbitrarily selected. Further, the cost of each functional unit to be stored in cost storage section 92 may be a weighted sum of a failure rate cost, a random cost, (a failed cost), and a duplication cost, a product thereof, an arithmetic mean thereof, or a geometrical average thereof instead of the sum thereof.

In the first and second embodiments, connective relation generating means 84 generates a set of connective relations of the functional units which minimizes the sum of the costs of the functional units to be used. However, a set of connective relations to be generated may be selected so as to minimize a weighted sum of the costs of the functional units, a product thereof, an arithmetic mean thereof, or a geometrical average thereof.

In the first and second embodiments, exemplified is the case where duplication cost assigning means 83 uses the number of connective relations per every functional unit (duplication number) as the duplication cost. However, duplication cost assigning means 83 may use another value such as an exponential function of the duplication number as the duplication cost.

In the first and second embodiments, a failure rate cost, a random cost, (a failed cost), and a duplication cost are summed up in cost storage section 92. However, a part of these costs, or example, any one, any two, or any three selected from a group consisting of a failure rate cost, a random cost, and a duplication cost may be summed up to form a total cost of each functional unit. A sole Random cost or a sole duplication cost can apparently used as total cost because they vary each time a set of connective relations is generated. A sole failure rate cost can also used as total cost though it does not vary each time a set of connective relations is generated because an initial condition for generation a set of connective relations varies in connective relation generating means 84.

In the second embodiments, failed functional unit disabling means 85 adds a large failed cost to the cost of the failed functional units detected by detector 4. Alternatively, failed functional unit disabling means 85 may store a constraint condition for inhibiting usage of the failed functional units in constraint storage section 93.

In the above first and second embodiments, the high reliability system comprises data processors 8, 10 and design information storage 9 but these devices may be separated after generating connective relations and storing them in connective relation storage 5. For example, it is possible to configure data processors 8, 10 and design information storage 9 with a personal computer (PC) or a workstation (WS) which are connected with a network and located at a distant place. In such system, a computer, which is also connected with the network and located near to connective relation storage 5, can receive the connective relations of the functional units from the PC or WS which configures data processors 8 and 10, store the connective relations in connective relation storage 5, and thereafter the communication links with the PC or WS may be disconnected.

In the first and second embodiments, the high reliability system includes functional unit set 1, alteration device 2, selector 3 and detector 4. However, the system does not require these devices when functional unit set 1 does not providing a service. That is, generating the connective relations by data processors 8, 10 and design information storage 9 can be performed independently of and separately from the operation of the whole system.

Figure 23:
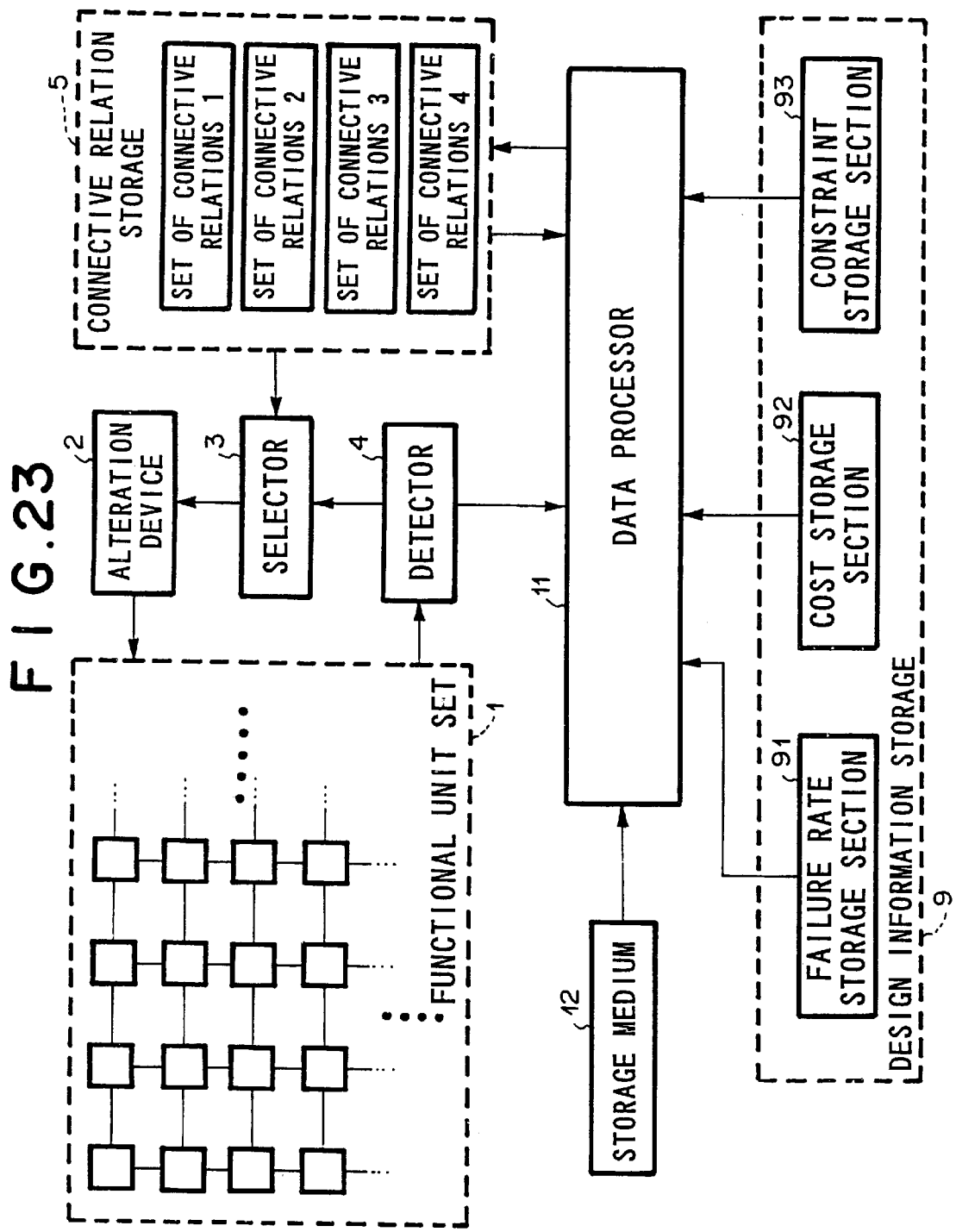
FIG. 23 is a block diagram showing an arrangement of a high reliability system according to a modified embodiment of the present invention.
Figure 24:
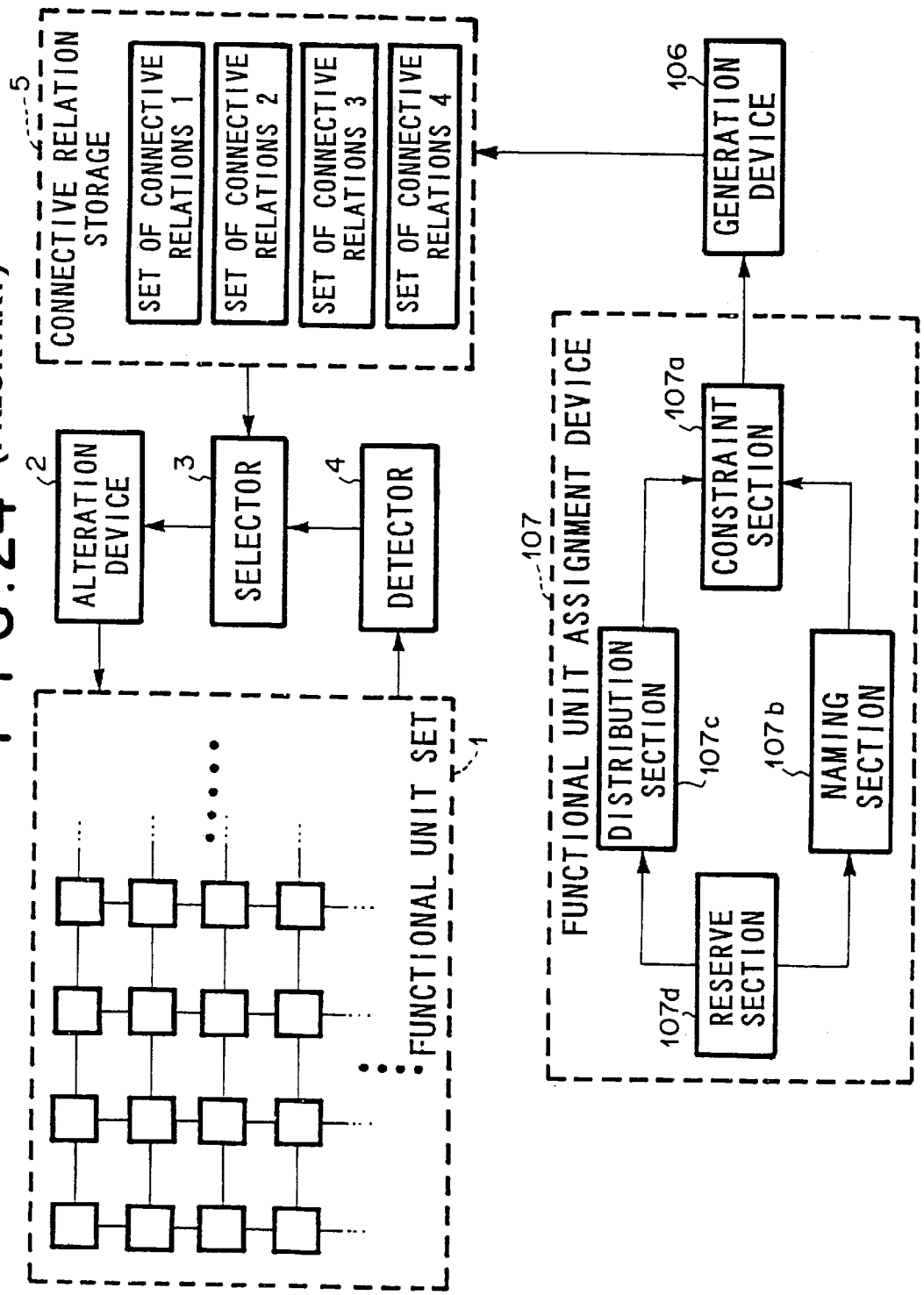
FIG. 24 is a block diagram showing an arrangement of a high reliability system in the prior art.

In the first and second embodiments, the programs for realizing the functions of means 81–85 of data processors 8 and are stored in memories included in data processors 8 and 10. However, as shown in FIG. 23, these programs can be stored in storage medium 12 and be loaded into a memory of data processor 11 at the time of execution. Thus, the programs for realizing the processes of the present invention can be circulated independently of the device by storing them in storage medium 12 for distributing. As storage medium 12, various computer readable mediums such as an optical disk, magnetic disc and semiconductor memory can be available.

Further, detector 4 may be generalized to detect a certain state other than a failure of a functional unit. Such state is, for example, a reservation for other certain operation. In connection with this generalization, failed functional unit disabling means 85 may be generalized as a state cost assignment means. Such detector and state cost assignment means may let connective relation generating means 84 generate a set of connective relations which excludes a functional unit in a concerned state.

As explained above, according to the present invention, the connective relations of the functional units can be generated in consideration of the constraints on connecting the functional units. In addition, the computational complexity for generating the connective relations can be suppressed.

Having explained preferred embodiments of the present invention, it will now become apparent to those of ordinary skill in the art that other embodiments incorporated these concepts may be used. Accordingly, it is submitted that the invention should not be limited to the explained embodiments but rather should be limited only by the spirit and scope of the appended claims.

What is claimed is:

1. A high reliability system, which comprises:
   a functional unit set having a plurality of functional units, each of said functional units being capable of being connected with any other functional unit;
   a reliability storing means for storing a reliability of each functional unit contained in said functional unit set;
   a cost assigning means for assigning to each functional unit a reliability cost as a cost in accordance with the reliability stored in said reliability storing means;
   a cost storing means for storing the cost of each functional unit;
   a constraint storing means for storing constraints on connections of the functional units contained in said functional unit set;
   a connective relation generating means for generating a plurality of sets of connective relations of the functional units in said functional unit set in accordance with the costs of the functional units stored in said cost storing means and the constraints stored in said constraint storing means;
   a connective relation storing means for storing the plurality of sets of the connective relations of the functional units generated by said connective relation generating means;
   a failed functional unit detecting means for detecting a failed functional unit among the functional units contained in said functional unit set;
   a selecting means for selecting, among the sets of connective relations of the plurality of functional units stored in said connective relation storing means, a set not containing the failed functional unit detected by said failed functional unit detecting means; and
   an altering means for connecting the functional units in said functional unit set in accordance with the selected set of the connective relations of the functional units.

2. A high reliability system, which comprises:
   a functional unit set having a plurality of functional units, each of said functional units being capable of being connected with any other functional unit;
   a cost assigning means for assigning a random cost as a cost to each functional unit contained in said functional unit set;
   a cost storing means for storing the cost of each functional unit;
   a constraint storing means for storing constraints on connections of the functional units contained in said functional unit set;
   a connective relation generating means for generating a plurality of sets of connective relations of the functional units in said functional unit set in accordance with the costs of the functional units stored in said cost storing means and the constraints stored in said constraint storing means;
   a connective relation storing means for storing the plurality of sets of the connective relations of the functional units generated by said connective relation generating means;
   a failed functional unit detecting means for detecting a failed functional unit among the functional units contained in said functional unit set;
   a selecting means for selecting, among the sets of connective relations of the plurality of functional units stored in said connective relation storing means, a set not containing the failed functional unit detected by said failed functional unit detecting means; and
   an altering means for connecting the functional units in the functional unit set in accordance with the selected set of the connective relations of the functional units.

3. A high reliability system, which comprises:
   a functional unit set having a plurality of functional units, each of said functional units being capable of being connected with any other functional unit;
   a cost assigning means for assigning to each functional unit a cost corresponding to connective relations of the functional units as a cost, said connective relations being stored in a connective relation storing means;
   a cost storing means for storing the cost of each functional unit;
   a constraint storing means for storing constraints on connections of functional units contained in said functional unit set;
   a connective relation generating means for generating a plurality of sets of connective relations of the functional units in said functional unit set in accordance with the costs of the functional units stored in said cost storing means and the constraints stored in said constraint storing means;
   a connective relation storing means for storing the plurality of sets of the connective relations of the functional units generated by said connective relation generating means;
   a failed functional unit detecting means for detecting a failed functional unit among the functional units contained in said functional unit set;
   a selecting means for selecting, among the sets of the connective relations of the plurality of functional units stored in said connective relation storing means, a set not containing the failed functional unit detected by said failed functional unit detecting means; and an altering means for connecting the functional units in said functional unit set in accordance with the selected set of the connective relations of the functional units.

4. The high reliability system according to any one of claims 1–3, which further comprises:

a detecting means for detecting a functional unit in a predetermined state in said functional unit set; and a state cost assigning means for adding a predetermined cost to the cost of the functional unit detected by said detecting means.

5. The high reliability system according to any one of claims 1–3, which further comprises:

a detecting means for detecting a functional unit in a predetermined state in said functional unit set; and a constraint adding means for storing in said constraint storing means an additional constraint to disable the functional unit detected by said detecting means.

6. An apparatus for generating connective relations of functional units contained in a functional unit set, said each functional unit being capable of being connected with any other functional unit, which apparatus comprises:

a reliability storing means for storing a reliability of each functional unit contained in said functional unit set;

a cost assigning means for assigning to each functional unit a reliability cost as a cost in accordance with the reliability stored in said reliability storing means;

a cost storing means for storing the cost of each functional unit;

a constraint storing means for storing constraints on connections of the functional units contained in said functional unit set; and a connective relation generating means for generating a plurality of sets of connective relations of the functional units in said functional unit set in accordance with the costs of the functional units stored in said cost storing means and the constraints stored in said constraint storing means.

7. An apparatus for generating connective relations of functional units contained in a functional unit set, said each functional unit being capable of being connected with any other functional unit, which apparatus comprises:

a cost assigning means for assigning a random cost as a cost to each functional unit contained in said functional unit set;

a cost storing means for storing the cost of each functional unit;

a constraint storing means for storing constraints on connections of the functional units contained in said functional unit set; and a connective relation generating means for generating a plurality of sets of connective relations of the functional units in said functional unit set in accordance with the costs of the functional units stored in said cost storing means and the constraints stored in said constraint storing means.

8. An apparatus for generating connective relations of functional units contained in a functional unit set, said each functional unit being capable of being connected with any other functional unit, which apparatus comprises:

a cost assigning means for assigning to each functional unit a cost corresponding to connective relations of the functional units as a cost, said connective relations being stored in a connective relation storing means existing externally;

a cost storing means for storing the cost of each functional unit;

a constraint storing means for storing constraints on connections of functional units contained in said functional unit set; and a connective relation generating means for generating a plurality of sets of connective relations of the functional units in said functional unit set in accordance with the costs of the functional units stored in said cost storing means and the constraints stored in said constraint storing means.

9. The apparatus for generating a connective relation according to any one of claims 6–8, which further comprises:

a detecting means for detecting a functional unit in a predetermined state in said functional unit set; and a state cost assigning means for adding a predetermined cost to the cost of the functional unit detected by said detecting means.

10. The apparatus for generating a connective relation according to any one of claims 6–8, which further comprises:

a detecting means for detecting a functional unit in a predetermined state in said functional unit set; and a constraint adding means for storing in said constraint storing means an additional constraint to disable the functional unit detected by said detecting means.

11. A method for generating connective relations of functional units contained in a functional unit set, said each functional unit being capable of being connected with any other functional unit, which method comprises:

a reliability storing step for storing a reliability of each functional unit contained in said functional unit set;

a cost assigning step for assigning to each functional unit a reliability cost as a cost in accordance with the reliability having been stored;

a cost storing step for storing the cost of each functional unit;

a constraint storing step for storing constraints on connections of the functional units contained in said functional unit set; and a connective relation generating step for generating a plurality of sets of connective relations of the functional units in said functional unit set in accordance with the costs of the functional units having been stored and the constraints having been stored.

12. A method for generating connective relations of functional units contained in a functional unit set, said each functional unit being capable of being connected with any other functional unit, which method comprises:

a cost assigning step for assigning a random cost as a cost to each functional unit contained in said functional unit set;

a cost storing step for storing the cost of each functional unit;

a constraint storing step for storing constraints on connections of the functional units contained in said functional unit set; and a connective relation generating step for generating a plurality of sets of connective relations of the functional units in said functional unit set in accordance with the costs of the functional units having been stored and the constraints having been stored.

13. A method for generating connective relations of functional units contained in a functional unit set, said each functional unit being capable of being connected with any other functional unit, which method comprises:

a cost assigning step for assigning to each functional unit a cost corresponding to connective relations of the functional units as a cost, said connective relations having been stored;

a cost storing step for storing the cost of each functional unit;

a constraint storing step for storing constraints on connections of functional units contained in said functional unit set; and a connective relation generating step for generating a plurality of sets of connective relations of the functional units in said functional unit set in accordance with the costs of the functional units having been stored and the constraints having been stored.

14. The method for generating a connective relation according to any one of claims 11–13, which further comprises:

a detecting step for detecting a functional unit in a predetermined state in said functional unit set; and a state cost assigning step for adding a predetermined cost to the cost of the functional unit detected at said detecting step.

15. The method for generating a connective relation according to any one of claims 11–13, which further comprises:

a detecting step for detecting a functional unit in a predetermined state in said functional unit set; and a constraint adding step for storing an additional constraint to disable the functional unit detected at said detecting step.

16. A computer readable storage medium for enabling a computer to generate connective relations of functional units contained in a functional unit set, said each functional unit being capable of being connected with any other functional unit, which medium comprises instructions for enabling the computer to execute:

a reliability storing step for storing a reliability of each functional unit contained in said functional unit set;

a cost assigning step for assigning to each functional unit a reliability cost as a cost in accordance with the reliability having been stored;

a cost storing step for storing the cost of each functional unit;

a constraint storing step for storing constraints on connections of the functional units contained in said functional unit set; and a connective relation generating step for generating a plurality of sets of connective relations of the functional units in said functional unit set in accordance with the costs of the functional units having been stored and the constraints having been stored.

17. A computer readable storage medium for enabling a computer to generate connective relations of functional units contained in a functional unit set, said each functional unit being capable of being connected with any other functional unit, which medium comprises instructions for enabling the computer to execute:

a cost assigning step for assigning a random cost as a cost to each functional unit contained in said functional unit set;

a cost storing step for storing the cost of each functional unit;

a constraint storing step for storing constraints on connections of the functional units contained in said functional unit set; and a connective relation generating step for generating a plurality of sets of connective relations of the functional units in said functional unit set in accordance with the costs of the functional units having been stored and the constraints having been stored.

18. A computer readable storage medium for enabling a computer to generate connective relations of functional units contained in a functional unit set, said each functional unit being capable of being connected with any other functional unit, which medium comprises instructions for enabling the computer to execute:

a cost assigning step for assigning to each functional unit a cost corresponding to connective relations of the functional units as a cost, said connective relations having been stored;

a cost storing step for storing the cost of each functional unit;

a constraint storing step for storing constraints on connections of functional units contained in said functional unit set; and a connective relation generating step for generating a plurality of sets of connective relations of the functional units in said functional unit set in accordance with the costs of the functional units having been stored and the constraints having been stored.

19. The computer readable storage medium according to any one of claims 16–18, which further comprises instructions for enabling the computer to execute:

a detecting step for detecting a functional unit in a predetermined state in said functional unit set; and a state cost assigning step for adding a predetermined cost to the cost of the functional unit detected at said detecting step.

20. The computer readable storage medium according to any one of claims 16–18, which further comprises instructions for enabling the computer to execute:

a detecting step for detecting a functional unit in a predetermined state in said functional unit set; and a constraint adding step for storing an additional constraint to disable the functional unit detected at said detecting step.

* * * * *